US012681835B2

(12) United States Patent
Tanniru et al.

(10) Patent No.: US 12,681,835 B2
(45) Date of Patent: Jul. 14, 2026

(54) ARTIFICIAL INTELLIGENCE (AI)-BASED SYSTEM AND METHOD FOR GENERATING SYSTEM ARCHITECTURE REPRESENTATIONS

(71) Applicant: ACCENTURE GLOBAL SOLUTIONS LIMITED, Dublin (IE)

(72) Inventors: Rajendra Prasad Tanniru, Basking Ridge, NJ (US); Vijeth Srinivas Hegde, Bangalore (IN); Ravindra Kabbinale, Bangalore (IN); Santhosh Mv, Kasaragod (IN); Sreenath Kothavoor, Kannur (IN); Amrutha Pervody Bhat, Bangalore (IN); Naveen Raj K P, Kasaragod (IN); Lakshmi Srinivasan, Bangalore (IN); Koushik M Vijayaraghavan, Chennai (IN); Harshitha Shetty, Bantwal taluk (IN); Rajath Jain, Mysore (IN); Ashutosh Kumar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 269 days.

(21) Appl. No.: 18/665,012

(22) Filed: May 15, 2024

(65) Prior Publication Data

US 2025/0355784 A1 Nov. 20, 2025

(51) Int. Cl.
| | |
|---|---|
| *H04L 9/40* | (2022.01) |
| *G06F 8/10* | (2018.01) |
| *G06F 11/3604* | (2025.01) |

(52) U.S. Cl.
CPC ............ *G06F 11/3608* (2013.01); *G06F 8/10* (2013.01)

(58) Field of Classification Search
CPC .......... G06F 11/3608; G06F 8/10; G06F 8/75
See application file for complete search history.

(56) References Cited

U.S. PATENT DOCUMENTS

| | | | | | |
|---|---|---|---|---|---|
| 11,145,291 | B2 * | 10/2021 | Rusak | ..................... | G06F 40/56 |
| 12,541,342 | B1 * | 2/2026 | Goswami | .................. | G06F 8/30 |
| 2024/0111498 | A1 * | 4/2024 | Vaughn | ..................... | G06F 8/30 |

(Continued)

*Primary Examiner* — Chau Le

(74) *Attorney, Agent, or Firm* — Mannava & Kang, P.C.

(57) ABSTRACT

Systems and methods for generating system architecture representation by implementing machine learning (ML) techniques are disclosed. The system receives a request for generating system architecture representation from at least one user and generates an architecture summary for the received request. Further, the system determines an architecture pattern relevant to the received request based on a context of the generated architecture summary using the large language models and machine learning (ML) models. The system further generates an architecture code corresponding to the received request. The system validates the generated architecture code for determining errors in the generated architecture code based on compliance-based rules, legal-based rules, and security-based rules specific to an organization using the machine learning (ML) models. The system further generates the at least one system architecture representation based on successful validation and outputs the generated architecture code and the at least one system architecture representation on a user interface.

20 Claims, 13 Drawing Sheets

(56)                    References Cited

U.S. PATENT DOCUMENTS

2025/0045185 A1*   2/2025  Tang ................... G06F 11/3684
2025/0077188 A1*   3/2025  Guttridge .................. G06F 8/20
2025/0077551 A1*   3/2025  Simaria ................... G06F 40/47
2025/0265044 A1*   8/2025  Belhaoues ............... G06F 8/33
2025/0348283 A1*  11/2025  Guttridge ................. G06F 8/10

* cited by examiner

200

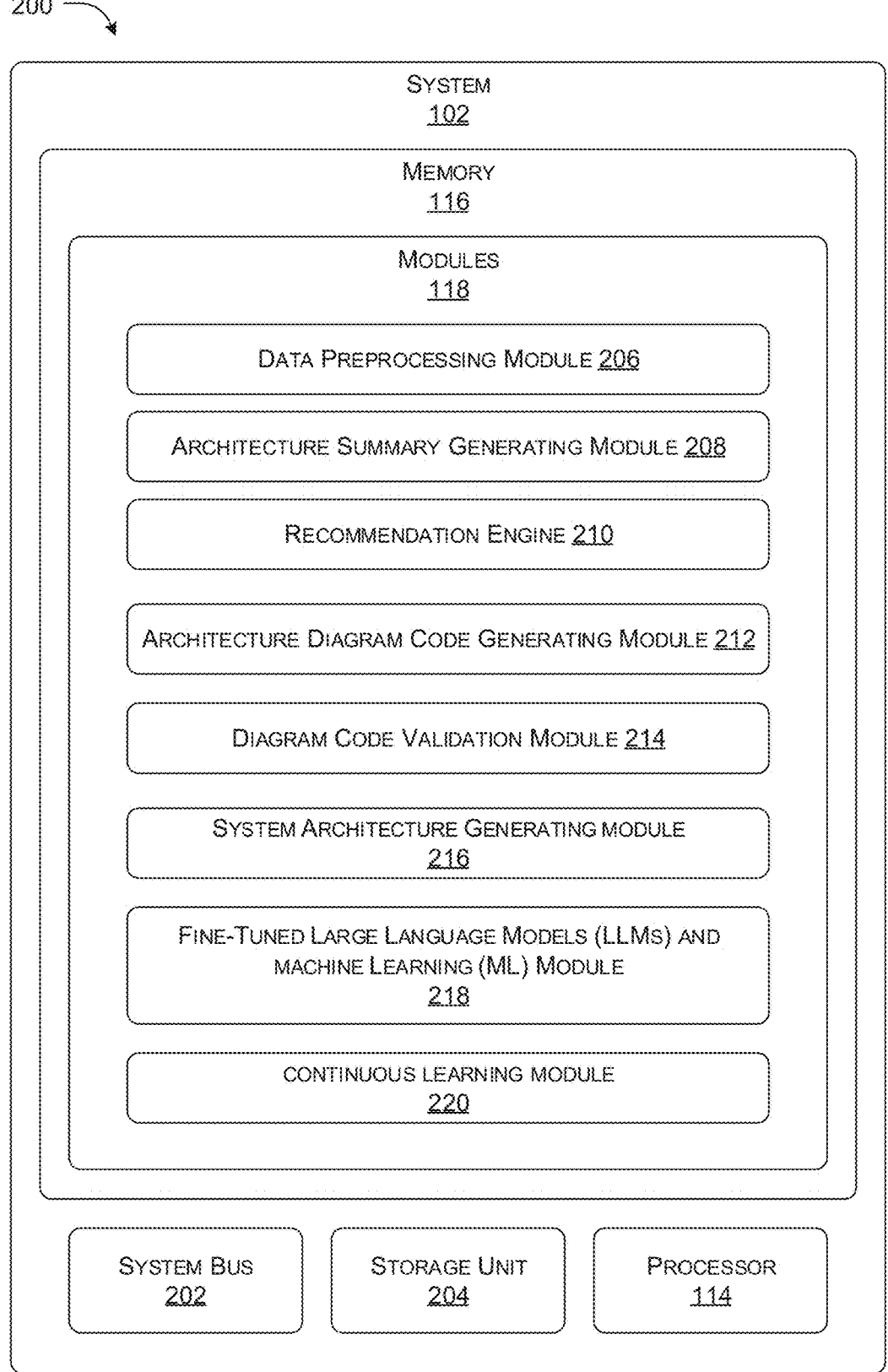

SYSTEM
102

MEMORY
116

MODULES
118

DATA PREPROCESSING MODULE 206

ARCHITECTURE SUMMARY GENERATING MODULE 208

RECOMMENDATION ENGINE 210

ARCHITECTURE DIAGRAM CODE GENERATING MODULE 212

DIAGRAM CODE VALIDATION MODULE 214

SYSTEM ARCHITECTURE GENERATING MODULE
216

FINE-TUNED LARGE LANGUAGE MODELS (LLMS) AND MACHINE LEARNING (ML) MODULE
218

CONTINUOUS LEARNING MODULE
220

SYSTEM BUS
202

STORAGE UNIT
204

PROCESSOR
114

FIG. 2

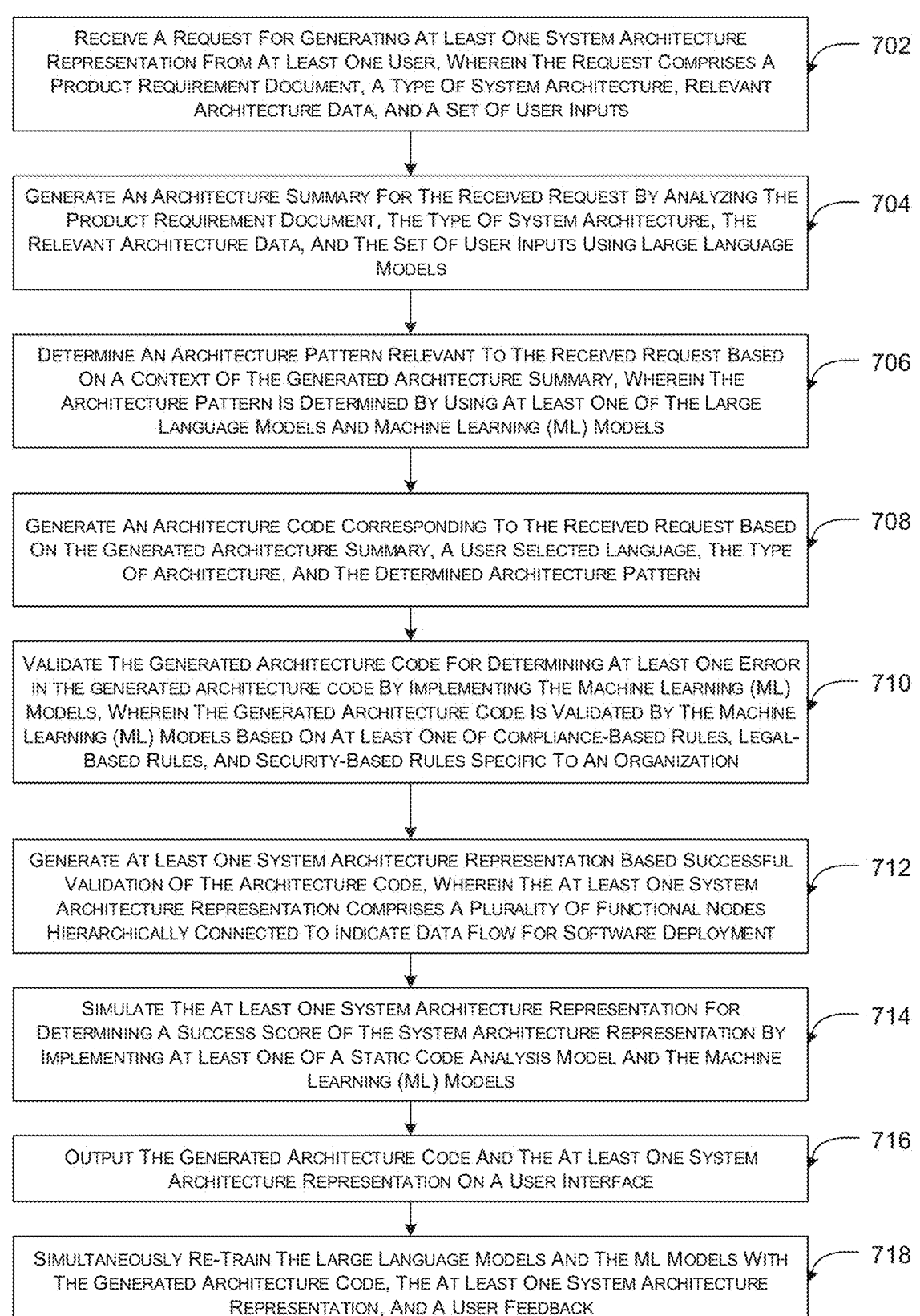

RECEIVE A REQUEST FOR GENERATING AT LEAST ONE SYSTEM ARCHITECTURE REPRESENTATION FROM AT LEAST ONE USER, WHEREIN THE REQUEST COMPRISES A PRODUCT REQUIREMENT DOCUMENT, A TYPE OF SYSTEM ARCHITECTURE, RELEVANT ARCHITECTURE DATA, AND A SET OF USER INPUTS — 702

GENERATE AN ARCHITECTURE SUMMARY FOR THE RECEIVED REQUEST BY ANALYZING THE PRODUCT REQUIREMENT DOCUMENT, THE TYPE OF SYSTEM ARCHITECTURE, THE RELEVANT ARCHITECTURE DATA, AND THE SET OF USER INPUTS USING LARGE LANGUAGE MODELS — 704

DETERMINE AN ARCHITECTURE PATTERN RELEVANT TO THE RECEIVED REQUEST BASED ON A CONTEXT OF THE GENERATED ARCHITECTURE SUMMARY, WHEREIN THE ARCHITECTURE PATTERN IS DETERMINED BY USING AT LEAST ONE OF THE LARGE LANGUAGE MODELS AND MACHINE LEARNING (ML) MODELS — 706

GENERATE AN ARCHITECTURE CODE CORRESPONDING TO THE RECEIVED REQUEST BASED ON THE GENERATED ARCHITECTURE SUMMARY, A USER SELECTED LANGUAGE, THE TYPE OF ARCHITECTURE, AND THE DETERMINED ARCHITECTURE PATTERN — 708

VALIDATE THE GENERATED ARCHITECTURE CODE FOR DETERMINING AT LEAST ONE ERROR IN THE GENERATED ARCHITECTURE CODE BY IMPLEMENTING THE MACHINE LEARNING (ML) MODELS, WHEREIN THE GENERATED ARCHITECTURE CODE IS VALIDATED BY THE MACHINE LEARNING (ML) MODELS BASED ON AT LEAST ONE OF COMPLIANCE-BASED RULES, LEGAL-BASED RULES, AND SECURITY-BASED RULES SPECIFIC TO AN ORGANIZATION — 710

GENERATE AT LEAST ONE SYSTEM ARCHITECTURE REPRESENTATION BASED SUCCESSFUL VALIDATION OF THE ARCHITECTURE CODE, WHEREIN THE AT LEAST ONE SYSTEM ARCHITECTURE REPRESENTATION COMPRISES A PLURALITY OF FUNCTIONAL NODES HIERARCHICALLY CONNECTED TO INDICATE DATA FLOW FOR SOFTWARE DEPLOYMENT — 712

SIMULATE THE AT LEAST ONE SYSTEM ARCHITECTURE REPRESENTATION FOR DETERMINING A SUCCESS SCORE OF THE SYSTEM ARCHITECTURE REPRESENTATION BY IMPLEMENTING AT LEAST ONE OF A STATIC CODE ANALYSIS MODEL AND THE MACHINE LEARNING (ML) MODELS — 714

OUTPUT THE GENERATED ARCHITECTURE CODE AND THE AT LEAST ONE SYSTEM ARCHITECTURE REPRESENTATION ON A USER INTERFACE — 716

SIMULTANEOUSLY RE-TRAIN THE LARGE LANGUAGE MODELS AND THE ML MODELS WITH THE GENERATED ARCHITECTURE CODE, THE AT LEAST ONE SYSTEM ARCHITECTURE REPRESENTATION, AND A USER FEEDBACK — 718

ARTIFICIAL INTELLIGENCE (AI)-BASED SYSTEM AND METHOD FOR GENERATING SYSTEM ARCHITECTURE REPRESENTATIONS

TECHNICAL FIELD

The present disclosure generally relates to artificial intelligence and machine learning systems and, more specifically, relates to an artificial intelligence (AI)-based system and a method for generating system architecture representations.

BACKGROUND

System architecture diagrams function as schematics for complex software systems. These diagrams provide a visually intuitive representation of system's constituent components, and their interrelationships. These diagrams hold significant value throughout a software development lifecycle (SDLC), promoting transparent communication among stakeholders, and serving as comprehensive documentation for ongoing maintenance and future modifications. Further, these diagrams provide a visual framework to aid informed decision-making during planning and design phases of the software development.

Typically, these system architecture diagrams may be created and customized manually which may hinder agility and effectiveness of the SDLC. Existing methods often require substantial user intervention, lack context-awareness, and struggle to adapt to dynamic nature of organizational needs. Existing tools either necessitate the user to initiate the process from scratch or rely on reusing pre-defined diagrams, limiting adaptability. In some examples, solution architects have manually created system architecture diagrams after detailed discussions and collaboration with various stakeholders using open-source tools. Traditionally, the system architecture diagrams primarily relied on a few approaches such as monolithic, client-server, or layered architectures. While the conventional approach for generating system architecture diagrams may be widely practiced and effective in many cases, this also has limitations and challenges. Some of the limitations and challenges of the conventional approach are they are focused on modular design, limited scalability, over-engineering, inefficient validation, and limited capabilities for adaptive behavior or real-time decision-making. In addition, traditional system architecture diagrams may be often designed based on upfront requirements and assumptions, which may not fully capture evolving user needs or changing business objectives. This rigidity may lead to architectures that are difficult to adapt or modify as requirements evolve over time.

Further, the conventional approaches may prioritize functional requirements over non-functional quality attributes such as performance, security, reliability, and maintainability. This can lead to architectures that fail to meet critical quality objectives or exhibit poor performance in production environments. Moreover, as traditional architectural decisions are often made based on assumptions, heuristics, or past experiences rather than empirical data or validation, this can lead to architectures that fail to address the root causes of problems or fail to meet the needs of end-users. Hence, the conventional approach hinder agility, increase the risk of regression errors, and slows down the pace of development.

Therefore, there is a need for an improved system and methods for generating software representation using machine learning and artificial intelligence systems to overcome the aforementioned limitations, in addition to providing other technical advantages.

SUMMARY

This section is provided to introduce certain objects and aspects of the present disclosure in a simplified form that are further described below in the detailed description. This summary is not intended to identify the key features or the scope of the claimed subject matter.

In one aspect, the present disclosure relates to a system for generating system architecture diagram representation. The system receives a request for generating at least one system architecture representation from at least one user. The request includes a product requirement document, a type of system architecture, relevant architecture data, and a set of user inputs. The system generates an architecture summary for the received request by analyzing the product requirement document, the type of system architecture, the relevant architecture data, and the set of user inputs using large language models. Further, the system determines an architecture pattern relevant to the received request based on the context of the generated architecture summary. The machine learning (ML) models. The system further generates an architecture code corresponding to the received request based on the generated architecture summary, a user selected language, the type of system architecture, and the determined architecture pattern. The system validates the generated architecture code for determining at least one error in the generated architecture code by implementing the machine learning (ML) models. The generated architecture code is validated by the machine learning (ML) models based on at least one of compliance-based rules, legal-based rules, and security-based rules specific to an organization. The system generates the at least one system architecture representation based on successful validation of the architecture code. The at least one system architecture representation includes a plurality of functional nodes hierarchically connected to indicate data flow for software deployment. Further, the system simulates the at least one system architecture representation for determining a success score of the at least one system architecture representation by implementing at least one of a static code analysis model and machine learning (ML) models. The system further outputs the generated architecture code and the at least one system architecture representation on a user interface. The system simultaneously retrains the large language models, and the ML models with the generated architecture code, the at least one system architecture representation, and user feedback.

In another aspect, the present disclosure relates to a method for generating system architecture diagram representation. The method includes receiving, by a processor, a request for generating at least one system architecture representation from at least one user. The request includes a product requirement document, a type of system architecture, relevant architecture data, and a set of user inputs. The method includes generating, by the processor, an architecture summary for the received request by analyzing the product requirement document, the type of system architecture, the relevant architecture data, and the set of user inputs using large language models. Further, the method includes determining, by the processor, an architecture pattern relevant to the received request based on a context of the generated architecture summary. The architecture pattern is determined by using at least one of the large language models and machine learning (ML) models. The method further includes generating, by the processor, an architecture code corresponding to the received request based on the generated architecture summary, a user selected language, the type of system architecture, and the determined architecture pattern. The method includes validating, by the processor, the generated architecture code for determining at least one error in the generated architecture code by implementing the machine learning (ML) models. The generated architecture code is validated by the machine learning (ML) models based on at least one of compliance-based rules, legal-based rules, and security-based rules specific to an organization. The method includes generating, by the processor, the at least one system architecture representation based on successful validation of the architecture code. The at least one system architecture representation includes a plurality of functional nodes hierarchically connected to indicate data flow for software deployment. Further, the method includes simulating, by the processor, the at least one system architecture representation for determining a success score of the at least one system architecture representation by implementing at least one of a static code analysis model and machine learning (ML) models. The method further includes outputting, by the processor, the generated architecture code and the at least one system architecture representation on a user interface. The method includes simultaneously retraining, by the processor, the large language models, and the ML models with the generated architecture code, the at least one system architecture representation, and user feedback.

In another aspect, the present disclosure relates to a non-transitory computer readable medium comprising a processor-executable instructions that cause a processor to receive a request for generating at least one system architecture representation from at least one user. The request includes a product requirement document, a type of system architecture, relevant architecture data, and a set of user inputs. The processor generates an architecture summary for the received request by analyzing the product requirement document, the type of system architecture, the relevant architecture data, and the set of user inputs using large language models. Further, the processor determines an architecture pattern relevant to the received request based on the context of the generated architecture summary. The architecture pattern is determined by using at least one of the large language models and machine learning (ML) models. The processor further generates an architecture code corresponding to the received request based on the generated architecture summary, a user selected language, the type of system architecture, and the determined architecture pattern. The processor validates the generated architecture code for determining at least one error in the generated architecture code by implementing the machine learning (ML) models. The generated architecture code is validated by the machine learning (ML) models based on at least one of compliance-based rules, legal-based rules, and security-based rules specific to an organization. The processor generates the at least one system architecture representation based on successful validation of the architecture code. The at least one system architecture representation includes a plurality of functional nodes hierarchically connected to indicate data flow for software deployment. Further, the processor simulates the at least one system architecture representation for determining a success score of the at least one system architecture representation by implementing at least one of a static code analysis model and machine learning (ML) models. The processor further outputs the generated architecture code and the at least one system architecture representation on a user interface. The processor simultaneously retrains the large language models, and the ML models with the generated architecture code, the at least one system architecture representation, and user feedback.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings include the disclosure of electrical components, electronic components or circuitry commonly used to implement such components.

FIG. 2 illustrates an exemplary block diagram representation of a computer-implemented system, such as those shown in FIG. 1, capable of generating system architecture diagram representation, in accordance with embodiments of the present disclosure.

FIG. 7 illustrates a flow chart depicting a method for generating system architecture diagram representation, in accordance with the embodiments of the present disclosure.

Figure 1:
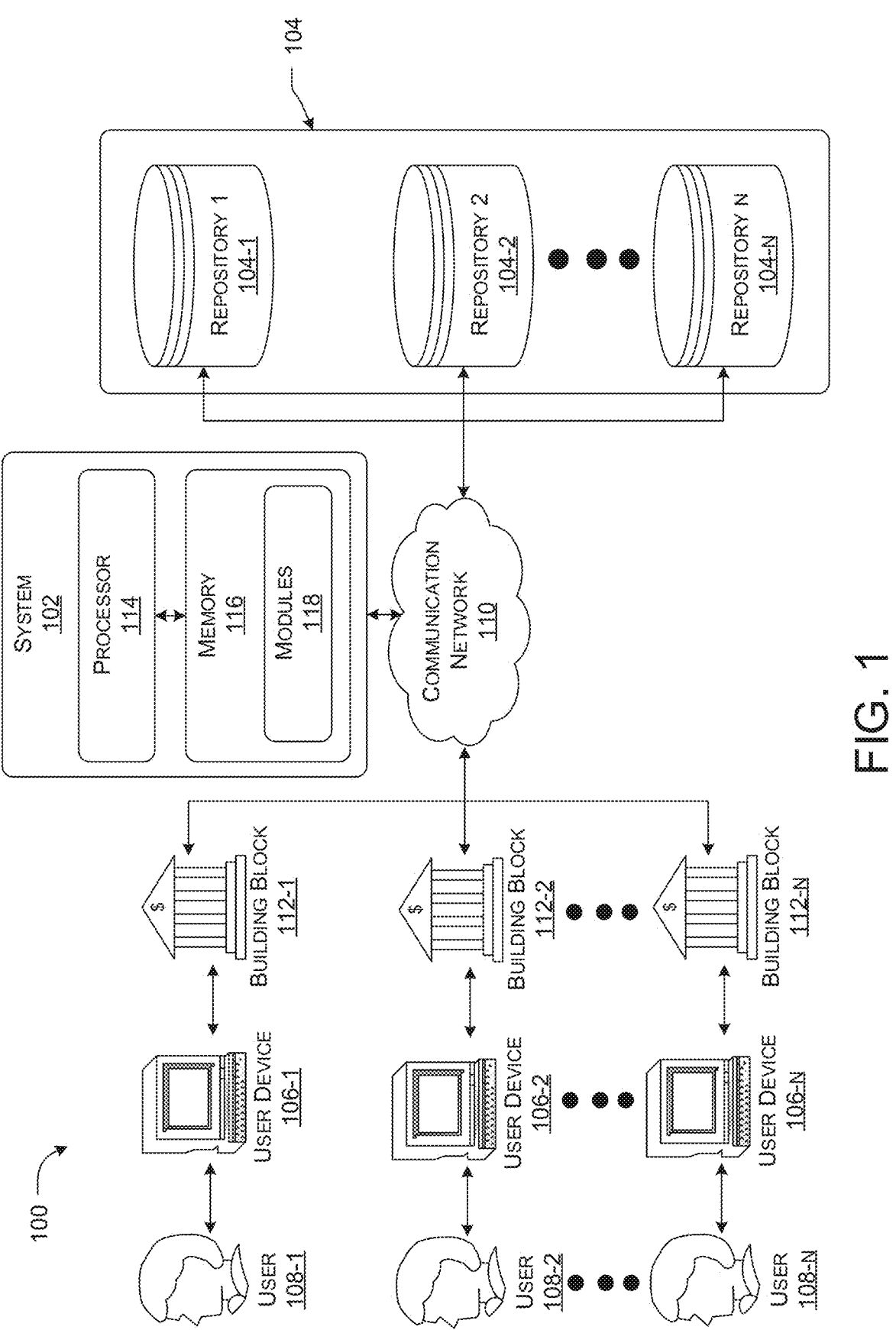
FIG. 1 illustrates an exemplary block diagram representation of a network architecture in which a system may be implemented for generating system architecture representation by implementing machine learning (ML) models, in accordance with embodiments of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes"," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a system and a method for generating system architecture diagram representation by implementing machine learning (ML) techniques. The system receives a request for generating at least one system architecture representation from at least one user. The request includes a product requirement document, a type of system architecture, relevant architecture data, and a set of user inputs. The system generates an architecture summary for the received request by analyzing the product requirement document, the type of system architecture, the relevant architecture data, and the set of user inputs using large language models. Further, the system determines an architecture pattern relevant to the received request based on the context of the generated architecture summary. The architecture pattern is determined by using at least one of the large language models and machine learning (ML) models. The system further generates an architecture code corresponding to the received request based on the generated architecture summary, a user selected language, the type of system architecture, and the determined architecture pattern. The system validates the generated architecture code for determining at least one error in the generated architecture code by implementing the machine learning (ML) models. The generated architecture code is validated by the machine learning (ML) models based on at least one of compliance-based rules, legal-based rules, and security-based rules specific to an organization. The system generates the at least one system architecture representation based on successful validation of the architecture code. The at least one system architecture representation includes a plurality of functional nodes hierarchically connected to indicate data flow for software deployment. Further, the system simulates the at least one system architecture representation for determining a success score of the at least one system architecture representation by implementing at least one of a static code analysis model and machine learning (ML) models. The system further outputs the generated architecture code and the at least one system architecture representation on a user interface. The system simultaneously trains the large language models, and the ML models with the generated architecture code, the at least one system architecture representation, and user feedback.

Referring now to the drawings, and more particularly to FIG. 1 through FIG. 9, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 in which a system 102 may be implemented for generating system architecture representation by implementing machine learning (ML) models, in accordance with embodiments of the present disclosure. The network architecture 100 may include the system 102, one or more repositories 104-1, 104-2, . . . , and 104-N (individually referred to as the repository 104, and collectively referred to as the repositories 104), and a user device 106 associated with at least one user 108 (collectively referred for a user 108-1, a user 108-2, . . . , and a user 108-N). In an embodiment, the system 102 may be a server system. Some examples of the server systems may be, but are not limited to, a cloud server, a centralized server, a rack server, a network server, a computer-based server, on premise server, a dedicated server, a remote server, and the like. All the system 102 of the network architecture 100 may be communicatively coupled to the user device 106 via a communication network 110. The communication network 110 may be a wired communication network and/or a wireless communication network.

The at least one user 108 (hereinafter interchangeably referred to as 'the user 108') may be an individual, an administrator, a vendor, a technician, a worker, a specialist, an instructor, a supervisor, a team, an entity, an organization, a company, a facility, a bot, any other user, and combination thereof. In an embodiment, the user 108 may be associated with organization 112 (as shown in FIG. 1). The entities such as the organization 112 may include, but are not limited to, information technology (IT) organizations, a hospital, a healthcare facility, an exercise facility, a laboratory facility, an e-commerce company, a merchant organization, an airline company, a hotel booking company, a company, an outlet, a manufacturing unit, an enterprise, an organization, an educational institution, a secured facility, a warehouse facility, a supply chain facility, any other facility and the like.

Further, the user device 106 may be used to provide input and/or receive output to/from the system 102. The user device 106 may present to the user one or more user interfaces for the user 108 to interact with the system 102 for generating the system architecture representation. The user device 106 may be at least one of, an electrical, an electronic, an electromechanical, and a computing device. The user device 106 may include, but is not limited to, a mobile device, a smartphone, a personal digital assistant (PDA), a tablet computer, a phablet computer, a wearable computing device, a virtual reality/augmented reality (VR/AR) device, a laptop, a desktop, a server, and the like.

Furthermore, the system 102 may be implemented by way of a single device or a combination of multiple devices that may be operatively connected or networked together. The system 102 may be implemented in hardware or a suitable combination of hardware and software. Further, the system 102 may include one or more processor(s) 114, and a memory 116. The memory 112 may include a plurality of modules 118. The system 102 may be a hardware device including the processor 114 executing machine-readable program instructions for generating at least the system architecture representation. Execution of the machine-readable program instructions by the processor 114 may enable the system 102 to perform the one or more operations described herein related to the system architecture generation. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more processors 114 may include, for example, microprocessors, microcomputers, microcontrollers, digital signal processors, central processing units, state machines, logic circuits, and/or any devices that manipulate data or signals based on operational instructions. Among other capabilities, the processor 114 may fetch and execute computer-readable instructions in the memory 116 operationally coupled with the system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, network devices, databases, network attached storage devices, assets, machinery, instruments, facility equipment, emergency management devices, image capturing devices, cooling devices, heating devices, compressors, any other devices, and combination thereof. The person skilled in the art should not be limiting the components/subsystems shown in FIG. 1.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, Bluetooth adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

In an exemplary embodiment, the system 102 may receive a request for generating at least one system architecture representation from the user 108. The user 108 may use the user device 106 to provide the request to the system 102 via the communication network 110. The request includes a product requirement document, a type of system architecture, image data, audio input, relevant architecture data, and a set of user inputs. In an example, the request may be transmitted by the user 108 to the system 102 for generating an e-commerce system architecture representation to provide an efficient shopping experience to their customers.

Some exemplary requirements for generating the e-commerce system architecture representation may be data related to catalog management to aggregate products from different vendors, a marketing platform for email marketing with personalized emails for promotions, and newsletters, integrate with payment gateways, and manage payments for a variety of payments methods such as unified payment interface (UPI), Debit or Credit Card, Cash on Delivery, and the like, creating an application for supply chain such as order management, inventory management, returns, and refunds, and the like, integrating with third party providers for reporting and analytics of sales, customer behavior, and the like, with custom dashboards and warehouse management system. The above requirements for generating the e-commerce system architecture representation may refer to an exemplary set of inputs provided by the user 108. In other words, the user 102 uploads the requirements (e.g., in pdf format), and selects the type of system architecture, and relevant architecture data.

In an exemplary embodiment, the system 102 generates an architecture summary for the received request by at least analyzing the product requirement document, the type of system architecture, the relevant architecture data, and the set of user inputs using large language models (LLMs). These large language models (LLMs) are typically pre-trained on massive text corpora using unsupervised learning techniques which will be further explained in detail.

In an exemplary embodiment, the system 102 determines an architecture pattern relevant to the received request based on a context of the generated architecture summary. The architecture pattern may be determined based at least on the user selection of one of an existing architecture route and a scratch architecture route. In one scenario, the user 108 may select a scratch architecture route. In this scenario, the system 102 may provide a recommendation list including a list of architecture patterns for user selection. In another scenario, the user 108 may select the existing architecture route. In this scenario, the system 102 may fetch the existing or defined architecture patterns from the memory and render them to the user 108 for user selection. It is to be noted that the architecture pattern (in both the cases) is determined by using at least one of the large language models and machine learning (ML) models.

In an exemplary embodiment, the system 102 generates an architecture diagram code corresponding to the received request based on the generated architecture summary, a user selected language, the type of architecture, and the determined architecture pattern. The language for generating the architecture diagram code may include, for example, but are not limited to, Python, Mermaid, or PlantUML.

In an exemplary embodiment, the system 102 validates the generated architecture diagram code for determining at least one error in the generated architecture code by implementing the machine learning (ML) models. The generated architecture diagram code is validated by the one or more machine learning (ML) models based at least on compliance-based rules, legal-based rules, and security-based rules specific to the organization 112. The ML models (trained with organization and project specific security, legal, and compliance standards) use natural language processing (NLP) to determine if these standards are incorporated into the requirement. Based on the analysis, the mandatory security, legal, and compliance requirements are added in the architecture diagram code even if it is missed in the requirement document tightening the security posture at the design phase.

In an exemplary embodiment, the system 102 generates at least one system architecture representation based on successful validation of the architecture diagram code. The at least one system architecture representation includes a plurality of functional nodes hierarchically connected to indicate data flow for software deployment.

In an exemplary embodiment, the system 102 simulates the at least one system architecture representation for determining a success score by implementing at least one of a static code analysis model and machine learning (ML) models. Once the architecture diagram code is generated, a code search (of application code) is performed for each component in the system architecture representation. For example, if the UI is designed with react, the code search checks for the react modules and the relevant components along with its dependencies.

Further, the system 102 may determine a simulation level of the at least one system architecture representation by implementing at least one of the static code analysis model and the machine learning (ML) models. Typically, a check is performed in the backend to validate if these packages (components-classes, or modules) are available in the respective language libraries. Furthermore, unique logics are written from scratch in an intelligent manner that can analyze the generated code i.e., test and evaluate if the generated code is valid by executing it in the backend, else automatically fixing the errors and identifying the suitable component based on the context, auto-heal and auto-fix the errors by creating automated prompts and create the various architecture diagrams without any user intervention. Thereafter, the system 102 computes the success score corresponding to the simulation level. The simulation level is determined based on checking the validity of the generated code in the backend.

In an exemplary embodiment, the system 102 outputs the generated architecture diagram code and the at least one system architecture representation on a user interface and simultaneously trains the large language models (LLMs), and the ML models with the generated architecture diagram code, the at least one system architecture representation, and user feedback.

FIG. 2 illustrates an exemplary block diagram representation of a computer-implemented the system 102, such as those shown in FIG. 1, capable of generating system architecture diagram representation, in accordance with embodiments of the present disclosure. The system 102 may also function as a computer-implemented system 102. The system 102 may include the one or more processors 114, the memory 116, and a storage unit 204. The one or more processors 114, the memory 116, and the storage unit 204 are communicatively coupled through a system bus 202 or any similar mechanism. The memory 116 includes the plurality of modules 118 in the form of programmable instructions executable by the one or more processors 114.

Further, the plurality of modules 118 includes a data pre-processing module 206, an architecture summary generating module 208, a recommendation engine 210, an architecture diagram code generating module 212, a diagram code validation module 214, a system architecture generating module 216, fine-tuned large language models (LLMs) and machine learning (ML) models 218, and a continuous learning module 220.

The one or more processors 114, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more processors 114 may also include embedded controllers, such as generic or programmable logic devices or arrays, application-specific integrated circuits, single-chip computers, and the like.

The memory 116 may be a non-transitory volatile memory and a non-volatile memory. The memory 116 may be coupled to communicate with the one or more hardware processors 114, such as being a computer-readable storage medium. The one or more hardware processors 114 may execute machine-readable instructions and/or source code stored in the memory 116. A variety of machine-readable instructions may be stored in and accessed from the memory 116. The memory 116 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 116 may include the plurality of modules 118 stored in the form of machine-readable instructions on any of the above-mentioned storage media and may be in communication with and executed by the one or more processors 114.

The storage unit 204 may be a cloud storage or a database such as those shown in FIG. 1. The storage unit 204 may store, but is not limited to, metadata, a plurality of datasets, training dataset, test dataset, classified test dataset, expanded training dataset, a classified test dataset, ranked list of recommended metrics, mitigation strategy, enterprise product, effort scores, re-selected datasets, re-trained models, performance metrics, model fairness level, explainability level, a dataset size, a model dimensionality, and a memory resource, plurality of AI models, K data samples, automatic pipelines for dataset any other data, and combinations thereof. The storage unit 204 may be any kind of database such as, but are not limited to, relational databases, dedicated databases, dynamic databases, monetized databases, scalable databases, cloud databases, distributed databases, any other databases, and a combination thereof.

In an exemplary embodiment, the data pre-processing module 206 receives the request for generating at least one system architecture representation from the user 108. The request includes a product requirement document, the type of system architecture, the relevant architecture data, and the set of user inputs. The user 108 uploads the product requirement document (e.g., in pdf format) and selects the required type of system architecture (e.g., high-level architecture and application architecture). For example, the product requirement document may be the business requirement document. Generally, the business requirement document is a large-size document that cannot be processed directly. These documents are passed through a framework (or the data pre-processing module 206) that breaks down the large document into smaller chunks (which are stored temporarily). Thereafter, the data (smaller chunks) from the data pre-processing module 206 is transmitted to the fine-tuned LLMs and ML models 218 for further processing. In addition, the data pre-processing module 206 pre-processes the set of user inputs received from the user 108 to generate a vector form of the set of user inputs. The vector form of the set of user inputs is generated based at least on a set of hyperparameters defined for the at least one system architecture representation to be generated.

The fine-tuned LLMs and ML models 218 are trained with training data (continuously) with historic organization specific data of a plurality of architecture types, architecture patterns with domains, and DU specific details. The historic organization specific data (e.g., 20+ years of data of the organization 112) includes enterprise data related to architecture diagrams, security compliance parameters and mandates to be complied with at an organization level, high-level design documents, and low-level design documents. The fine-tuned LLMs and ML models 218 trained with the training data are configured to perform one or more operations described herein, for generating the system architecture representation.

In an exemplary embodiment, the architecture summary generating module 208 creates the architecture summary for different diagram types based on the requirement uploaded by the user 108, the type of system architecture selected, and the like. This architecture summary can be customized by the user 108 and the summary is fed back to the fine-tuned LLMs 218. In particular, the processor 114 with access to the LLMs and ML models 218 identifies the missing information in the set of user inputs received from the user 108 by analyzing content, context, and pre-requisite criteria. Thereafter, the processor 114 dynamically creates a prompt for the identified missing information from at least the set of user inputs and the architecture summary. The processor 114 further obtains the missing information from the user 108 via a generative AI-based chatbot and updates the architecture summary based on obtained missing information.

In an exemplary embodiment, the recommendation engine 218 determines the architecture pattern relevant to the received request based on the context of the generated architecture summary. The architecture pattern is determined by using at least one of the large language models and machine learning (ML) models 218. The recommendation engine 218 identifies the user 108 and the associated DU and provides a recommendation architecture pattern based on the context of the project or the pattern followed by most of the projects within a tribe.

In one scenario, the user 108 may select the scratch architecture route and uploads the product requirement documents (such as business requirement document, high level document, low level document and the like) or provide the requirements as a writeup in the text box. In another scenario, the user 108 may select the existing architecture route and upload the product requirement data. Based on the requirements, the recommendation engine 218 provides recommendations of the existing architecture pattern from the repository 104 for user selection.

In an exemplary embodiment, the architecture diagram code generating module 212 generates the architecture diagram code corresponding to the received request based on the generated architecture summary, the user selected language, the type of architecture, and the determined architecture pattern. In case the user 108 has selected the application architecture type, the processor 114 (or the architecture diagram code generating module 212) generates the architecture diagram code for at least one of a high-level system architecture and an application-level system architecture based on the request received from the user 108. The application-level system architecture representation is generated upon generating the high-level system architecture representation and determining the architecture pattern.

In an exemplary embodiment, the processor 114 receives a set of customization inputs in the form of natural language input for updating the architecture diagram code in real-time. Further, the processor 114 validates whether the received set of customization inputs meets pre-defined criteria using the machine learning (ML) models 218. Thereafter, the processor 114 updates the architecture diagram code based on the received set of customization inputs upon successful validation.

In an exemplary embodiment, the diagram code validation module 214 with access to the LLMs and the ML models 218 validates the generated architecture diagram code for determining the at least one error in the generated architecture code. More specifically, the diagram code validation module 214 may include a compiler within the asset, that automatically executes the generated architecture diagram code and validates if the system architecture representation can be created successfully with the generated code. The generated architecture diagram code is validated by the one or more machine learning (ML) models based at least on compliance-based rules, legal-based rules, and security-based rules specific to an organization.

In an exemplary embodiment, the processor 114 (or the diagram code validation module 214) identifies at least one error in at least the set of user inputs, and the architecture diagram code. In particular, the processor validating the architecture diagram code to determine the at least one error in the generated architecture code using the machine learning (ML) models 218. The processor 114 is configured to map the plurality of errors with a pre-stored error table (stored in the repository 104 or the storage unit 204) to determine error rectification instructions and solutions. Further, the processor 114 generates a plurality of error rectification messages based on the mapping. The error rectification messages include the error rectification instructions and solutions. Furthermore, the processor 114 outputs the generated plurality of error rectification messages and dynamically generates prompts corresponding to the plurality of errors identified for rectifying the plurality of errors in the architecture diagram code. It is to be noted that the plurality of errors is resolved in the architecture diagram code based at least on the implementation of the machine learning (ML) models 218 in response to at least the generated prompts. The generated prompts include the error rectification instructions and solutions corresponding to the identified plurality of errors.

In an exemplary embodiment, the processor 114 checks an import statement associated with the architecture diagram code with an import statement pattern. Thereafter, the processor 114 identifies the plurality of errors in the architecture diagram code based on determining a mismatch in components associated with the import statement and the import statement pattern. The processor 114 generates the prompts to the machine learning (ML) models to resolve the plurality of errors.

In an exemplary embodiment, the system architecture generating module 216 generates the system architecture representation based on successful validation of the architecture diagram code. The system architecture representation includes the plurality of functional nodes hierarchically connected to indicate data flow for the software deployment. Further, the system architecture generating module 216 simulates the at least one system architecture representation for determining the success score by implementing at least one of the static code analysis model and the machine learning (ML) models 218. Thereafter, the processor 114 outputs the generated architecture diagram code and the at least one system architecture representation on a user interface and simultaneously trains the large language models and the ML models 218 with the generated architecture diagram code, the at least one system architecture representation, and the user feedback.

In an exemplary embodiment, the processor 114 (or the system architecture generating module 216) generates the application-level system architecture representation upon generating the high-level system architecture representation and determining the architecture pattern.

In an exemplary embodiment, the processor 114 generates a knowledge graph representation for the generated system architecture representation based on the static code analysis model. The knowledge graph includes application code and respective connected components. The static code analysis model includes a static code represented in a continuous vector format as embeddings. Further, the embeddings are represented as knowledge graphs indicating a relationship between code structures in a structured manner. Thereafter, the processor 114 recommends the application code along with the related code structures based on the generated knowledge graph for developing the software code.

In an exemplary embodiment, the processor 114 determines the simulation level of the at least one system architecture representation by implementing at least one of the static code analysis model and the machine learning (ML) models 218. Thereafter, the processor 114 computes the success score of the at least one system architecture representation corresponding to the determined simulation level.

In an exemplary embodiment, the continuous learning module 220 may create a feedback loop for continuous training and tuning the LLM and ML models 218 and the plurality of datasets based on the generated architecture diagram code, the at least one system architecture representation, and the user feedback.

Figure 3:
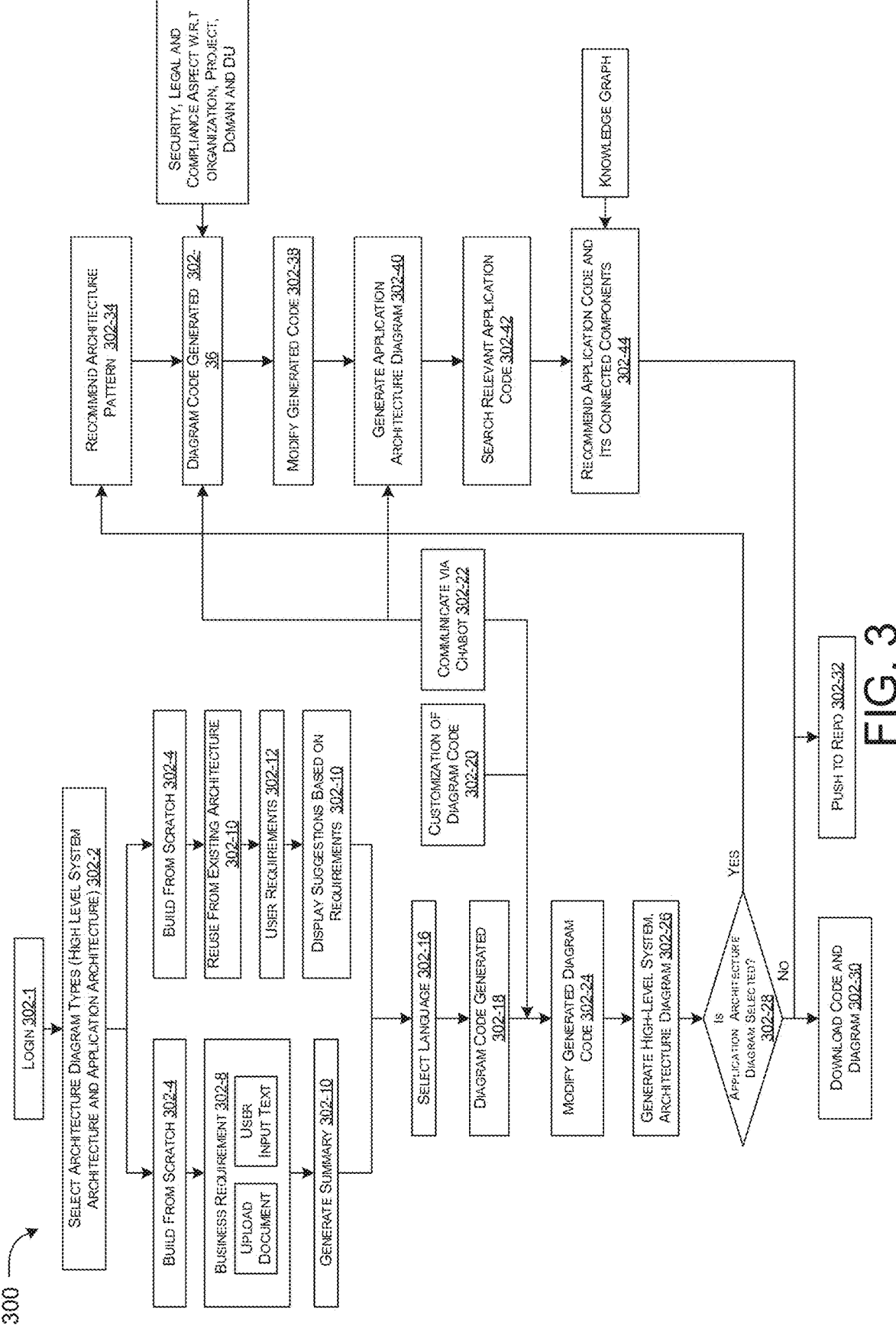
FIG. 3 is a process flowchart illustrating an example method of generating the system architecture diagram representation, in accordance with embodiments of the present disclosure.

FIG. 3 is a process flowchart illustrating an example method 300 of generating the system architecture diagram representation, in accordance with embodiments of the present disclosure.

At step 302-1, the user 108 logs in to a system architecture generating tool. The system architecture generating tool may be hosted and managed by the system 102. The system architecture generating tool is a set of computer-executable codes configured to allow the user 108 to generate the system architecture diagram representation. In one embodiment, the system architecture generating tool may be accessed as a web-based application on the user device 106.

At step 302-2, the user 108 selects the type of system architecture. The type of system architecture may include one of the high-level system architecture and the application system architecture to be generated.

The user 108 selects if the system architecture diagram representation should be built from the scratch generation route (see, step 302-4) or the existing architecture route (see, step 302-6) (reused from the existing system architecture that is already available).

In one case the user 108 selects the system architecture diagram representation the scratch generation route (or build from scratch option) as explained in step 302-4. In this scenario, the user 108 can upload product requirement documents (like business requirement document, high level document, low level document and the like) or provide the requirements as a writeup in the text box (see, step 302-8).

At step 302-10, based on the requirements, the architecture summary is generated with required information for the different architecture diagrams selected by the user 108.

In another case the user 108 selects the reuse from existing architecture as explained in step 302-6. At step 302-12, the user 108 provides the requirements as a writeup in the text box. At step 302-14, the system 102 provides a recommendation of most relevant architecture diagram from the existing library (or the repository 104) to the user 108. The user 108 can choose one recommended architecture diagram pattern for each architecture diagram type selected by the user 108.

At step 302-16, the user 108 selects the language in which the architecture diagram code should be generated. Some examples of the languages are Python, Mermaid, and PlantUML.

At step 302-18, the system 108 generates the architecture diagram code based on the set of inputs of the user 108, the product requirement document, the type of architecture, and the language selected.

In one scenario, once the architecture diagram code is generated, the user 108 can customize the code by providing a set of customization inputs, for example, in the form of natural language input in real-time (see, step 302-20). In another scenario, the user 108 may provide the required changes (or the set of customization inputs) to make modifications via the chatbot (see, step 302-22).

At step 302-24, the system 102 updates the architecture diagram code based on the customization inputs received either in the step 302-20, or the step 302-22. The architecture diagram code generated at step 302-24 is the high-level architecture diagram code.

At step 302-26, the system 102 generates the high-level system architecture diagram representation in case of selection of the high-level system architecture type. It is to be noted that the system 102 generates the high-level system architecture diagram representation once the high-level architecture diagram code satisfies the requirement and is error free, the high-level system architecture diagram representation is generated.

At step 302-28, the system 102 checks if the application system architecture type is selected by the user 108. In one scenario, if the application system architecture type is not selected, the system 102 outputs the generated high-level system architecture diagram representation on a user interface (UI) in the user device 106 (see, step 302-30). The high-level system architecture representation can be downloaded by the user by providing inputs in the user interface. At step 302-32, the high-level system architecture representation is stored in the repository 104 as per user requirement. In another scenario, if the application system architecture type is selected, step 302-34 is performed.

At step 302-34, the system 102 provides the recommendations including the architecture patterns to the user 108 based on the set of user inputs, the product requirement data, and the relevant architecture data. The user 108 select one or more architecture patterns from the recommendations.

At step 302-36, the system 108 generates the architecture diagram code for the application system architecture type. The system 108 validates the architecture diagram code with security, legal, and compliance aspects with respect to the organization 112, project, domain, and DU.

At step 302-38, the system 108 modifies the generated architecture diagram code based on the customization inputs received from the user 108 by performing the steps 302-20 and 302-22.

At step 302-40, the system 108 generates the application system architecture diagram representation. The user 108 may also modify the application system architecture diagram representation by providing the customization inputs received as explained in steps 302-20, 302-22.

At step 302-42, the system 108 with the static code analysis to search the react modules and the relevant components along with its dependencies. Typically, the static code analysis is performed using GenAI and the static code analysis tools on the historic data.

At step 302-44, the system 108 provides recommendations of the application code and the connected components. The recommendations of the application code and the connected components using the knowledge graphs. The knowledge graphs help in identifying the relevant code along with the other dependent code. These recommendations are ranked and listed to the user based on contextual relevance. Upon generating the recommendations, the relevant code, and the application system architecture diagram representation, steps 302-30, 302-32.

Figure 4:
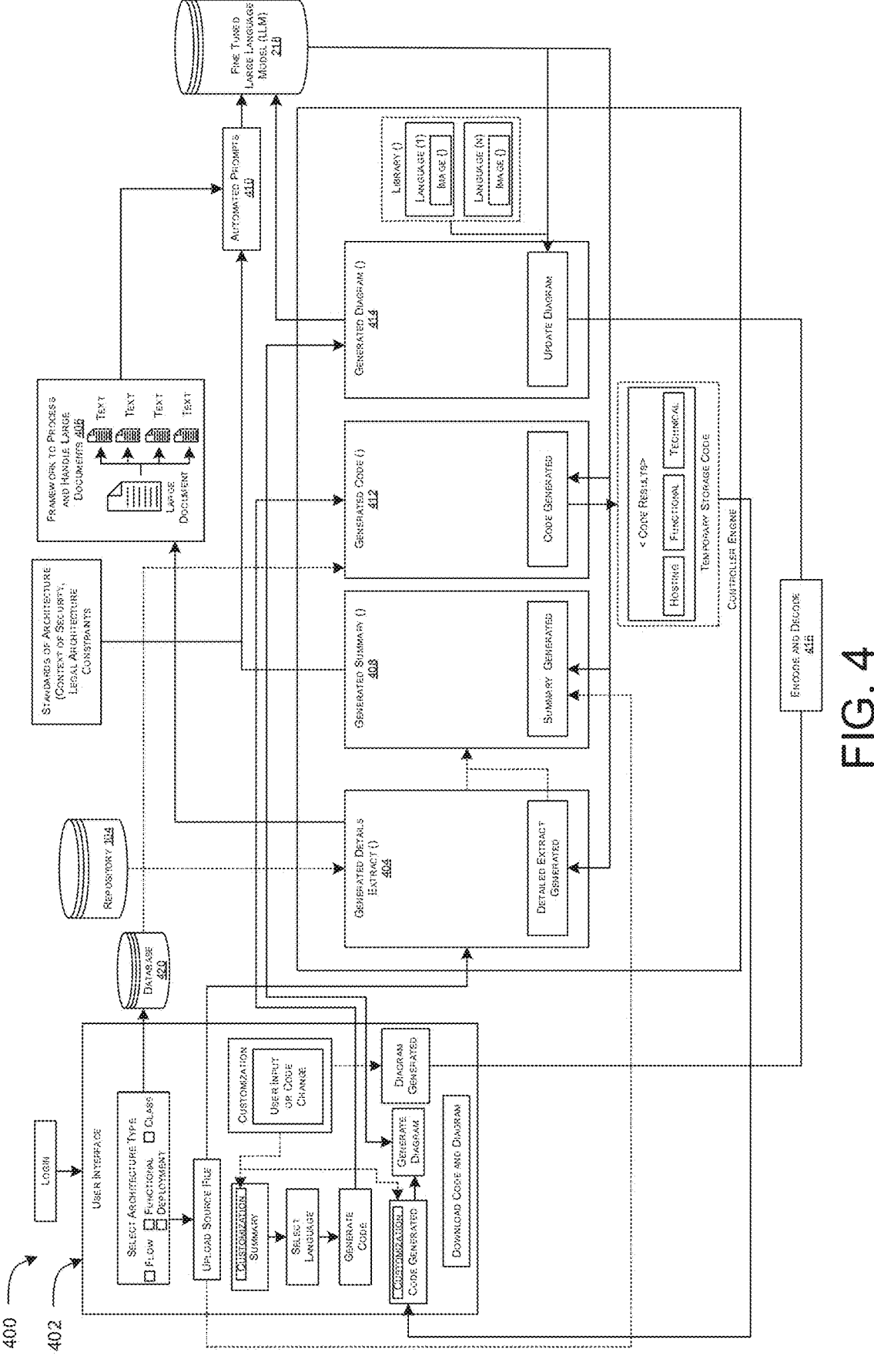
FIG. 4 is a process flowchart illustrating a high-level technical architecture, in accordance with embodiments of the present disclosure.

FIG. 4 is a process flowchart illustrating a high-level technical architecture 400, in accordance with embodiments of the present disclosure. As shown, the high-level technical architecture includes a set of modules for performing one or more operations for generating at least the architecture summary, the architecture diagram code, the system architecture diagram representation, and the application codes. The number and arrangement of systems, devices, modules, and/or networks shown in FIG. 4 are provided as an example. There may be additional systems, devices, and/or networks; fewer systems, devices, and/or networks; different systems, devices, modules, and/or networks, and/or differently arranged systems, devices, and/or networks than those shown in FIG. 4.

The high-level architecture 400 includes a functional flow block 402. The functional flow block 402 includes one or more operations performed by the system 102 or the user 108 in the user interface (UI) rendered to the user 108. The operations depicted in the functional flow block 402 are similar to at least some of the operations as explained with reference to FIG. 3, therefore they are not reiterated herein for the sake of brevity.

As shown in the functional flow block 402, once the user 108 logs in and selects the required architecture diagram types, the user selection is stored in the database 420. The database 420 may be the storage unit 204 or the repository 104. As explained above, the user 108 uploads the product requirement document (e.g., business requirement documents (HLD, LLD, and/or the like)) to the user interface. The database may be a SQL or NoSQL database for storing various data like user selection, generated diagrams, and the like.

Once the product requirement document is uploaded, a detailed extract generation module 404 is executed in the backend. In the detailed extract generation module 404, the method in which the uploaded documents should be broken down and processed is defined along with the output generation. The uploaded documents may be large sized documents that cannot be processed directly. These documents are passed through the pre-processing operations (or a document handling framework 406). The document handling framework breaks down the large documents into smaller chunks (which are stored temporarily) and sends the data (smaller chunks) to the fine-tuned LLM and ML models 218 to generate a detailed extract (or the detailed architecture summary) of the large document (BRD). Additionally, a temperature parameter may be defined or set as 0.0 for the fine-tuned LLM model 218 to make this generated detailed extract more focused and deterministic. The fine-tuned LLM model 218 generates the detailed extract (or the architecture summary) and sends it to a summary generation module 408 for further processing to generate a short summary for every architecture type selected by the user 108.

The summary generation module 408 may include various prerequisites defined for each architecture type. For example, cloud details, server details, and orchestration tool details are defined as prerequisites for deployment diagram. The summary generation module 408 may trigger automated prompts (see, 410) which are sent to the fine-tuned LLM 218 for generating the architecture summary for each architecture type and display in the user interface. As explained above, the generated architecture summaries can be customized by the end user 108 as per the requirements.

Once the architecture summary is finalized, the user 108 selects the language in which the architecture diagram code must be generated. Thereafter, the user 108 clicks generate code button in the user interface. Upon providing the user input on the generate code button, a code generation module 412 gets triggered. The code generation module 412 receives the user selection of different architecture types as input from the database 420. Further, the temperature parameter may be set as 0.4 for generating output from the fine-tuned LLM 218. The automated prompts are triggered which sends the language, architecture summary, and architecture diagram type to the fine-tuned LLM 218 for generating architecture diagram code. It is to be noted that the iteration continues for every system architecture type and the architecture diagram code is temporarily stored until the loop is completed. The code generation module 412 tests the architecture diagram code and has an error handling mechanism enabled to ensure the architecture diagram code is accurate. The architecture diagram code is displayed in the user interface for different architecture diagram types. Further, the user 108 can customize the architecture diagram code as per the requirement.

Once the user clicks the generate diagram button in the user interface, the system architecture diagram generation module 414 is executed. The system architecture diagram generation module 414 generates the system architecture diagram representation based on the updated architecture diagram code. The system architecture diagram representation is encoded (see, 416) and is sent to the user interface. This system architecture diagram representation can be easily modified based on natural language inputs from the chat service in the user interface or by changing the architecture diagram code and executing the generate diagram button on the user interface.

Thereafter, an application code search and generation module with the static analysis tool searches the react modules and the relevant components along with their dependencies. Typically, the static code analysis is performed using GenAI, and the static code analysis tools on the historic data and recommendations of the application code and the connected components are provided. The recommendations of the application code and the connected components using the knowledge graphs. Further, the operations performed by each of the aforementioned modules in the high-level technical architecture 400 are explained in detail with use cases.

Figure 5A:
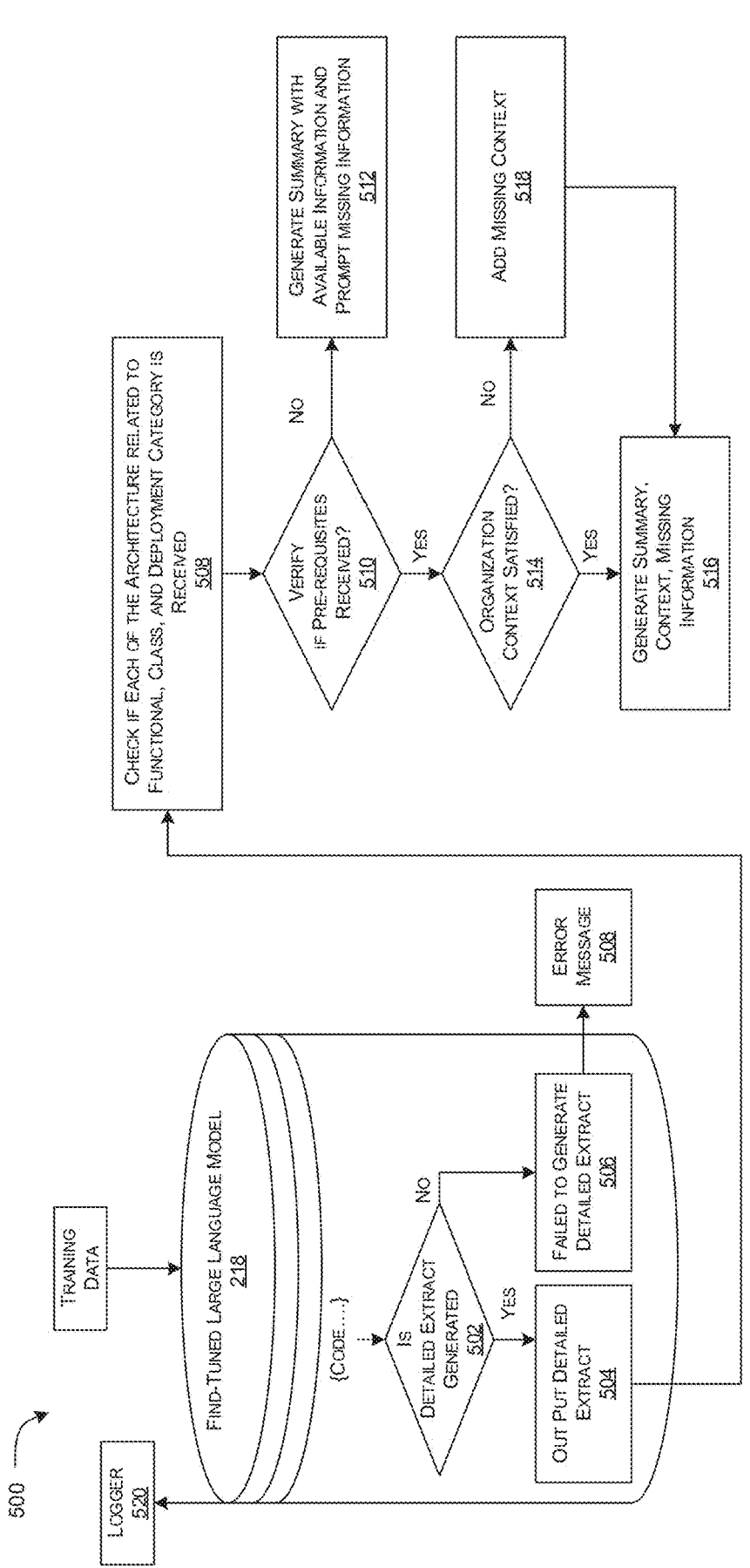
FIG. 5A is a process flowchart illustrating a detailed extract generation and summary generation process, in accordance with embodiments of the present disclosure.

FIG. 5A is a process flowchart 500 illustrating detailed extract generation and summary generation, in accordance with embodiments of the present disclosure.

As explained above, once the product requirement document is uploaded by the user 108, and the hyperparameters are set, a logger 520 continuously keeps tapping the logs. The product requirement document is sent to the framework (such as the document handling framework 406) that breaks down the large document into smaller texts that are temporarily stored. Each of these texts is vectorized and stored in a vector database (not shown in Figures). Once the vectorization is done, the detailed extract generation module 404 with the fine-tuned LLMs and ML models 218 triggers the automated prompts to generate the detailed extract.

In particular, over a period of time, the LLM models 218 are trained using public and private data for the model to adapt to the specific context of the client's business needs, organizations security, and legal requirements. Each of these vectorized texts is sent to the fine-tuned LLM models 218 as inputs. The fine-tuned LLM module 218 is instructed to return the detailed extract only after processing all the text (defined as 'Return intermediate steps=false') (see, 502). Based on the user input (LLD), the fine-tuned LLM model 218 with the detailed extract generation module 404 generates the detailed extract (see, 504). If the fine-tuned LLM model 218 may fail to generate the detailed extract (see, 506). In this case, the fine-tuned LLM model 218 prompts an error message (see, 508) on the user interface to receive user inputs (or missing information).

Upon generating the detailed extract in step 504, the summary generation module 408 checks if each of the architectures related to functional, class, and deployment category are received (see, 508). Thereafter, if prerequisites for each of the architecture types (as shown in table 1) selected by the user 108 are available in the detailed extract is verified (see, 510). In case the prerequisites for each of the architecture types are available, step 514 is performed.

An example of the prerequisites is listed below in Table. 1.

TABLE 1

| Diagram Types | Prerequisites |
| --- | --- |
| Functional | Start and end points - Input and Output |
| | Process steps with connectivity and terminators |
| | Key decisions and directions |
| Class | Class name |
| | Attributes of class |
| | Class operations |
| | Relationship between the classes |
| Deployment | Nodes |
| | Relationship between the nodes |
| | Artifacts and deployment targets |
| | Components like cloud provider, server, and orchestration tools |

In case all the prerequisites for each of the architecture types are unavailable, step 512 is performed. At 512, the architecture summary is generated with the available information and a prompt is generated for the user 108 for missing information, and step 514 is performed.

At 514, the summary generation module 408 checks if the organization specific context is satisfied. In case the organization specific context is satisfied, the architecture summary is generated (see, 516). In case the organization specific context is not satisfied, the missing information (i.e., missing context) is identified (see, 518). Thus, the missing context along with the architecture summary, and the context are provided as output at step 516 for rendering to the user interface.

Figure 5B:
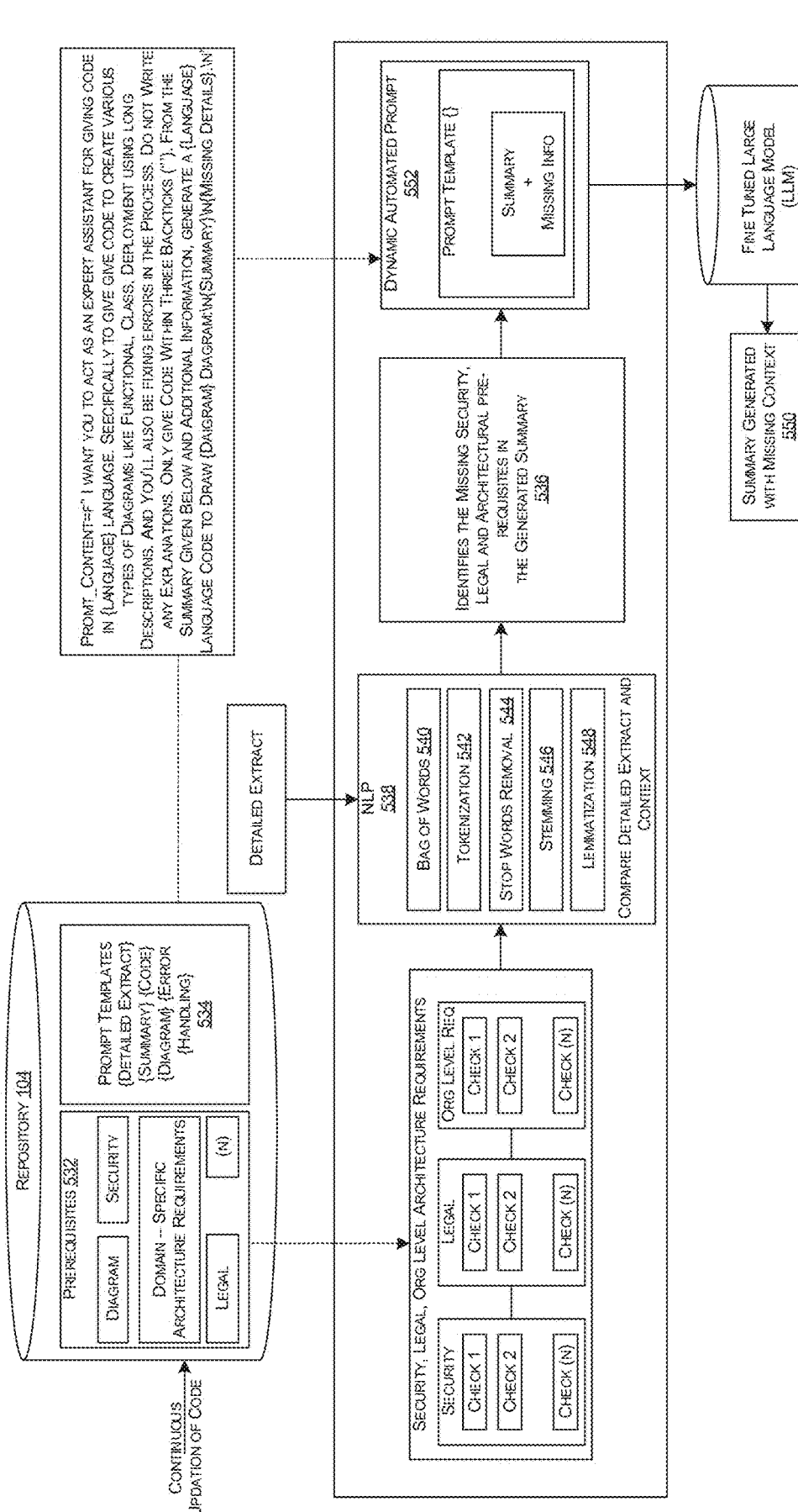
FIG. 5B is a block diagram representation illustrating security, legal, and compliance requirements specific to an organization, in accordance with embodiments of the present disclosure.

FIG. 5B is a block diagram representation illustrating security, legal, and compliance requirements specific to an organization (e.g., the organization 112), in accordance with embodiments of the present disclosure. As shown, the repository 104 stores prerequisites 532 and prompt templates 534 of the detailed extract, the architecture summary, the architecture diagram code, the system architecture representation, and error handling. It is to be noted that the repository 104 contains the code with the security, legal, and compliance requirements depending on the domain.

The prerequisites 532 may include security, legal, and compliance requirements specific to the organization 112, DU, and project are codified and interspersed in the asset code. These are written from scratch and the logic is built to ensure architecture is adhering to these requirements from the design phase itself.

Before the application architecture diagram code is generated, these logics scan through the architecture summary and identify if any of these specifications are not mentioned (see, 536). Further, the logic adds the missing specification in the architecture summary. Thereafter, the logic generates the architecture diagram code using the architecture summary and the missing specification. As shown, an NLP-based ML model 538 is used to perform the techniques like Bag of words 540, tokenization 542, stop words removal 544, stemming 546, and lemmatization 548 to identify the missing content and add it. Based on the identified missing information, a prompt 552 is created dynamically and sent to the LLM to regenerate summary with missing information (see, 550).

Figure 6A:
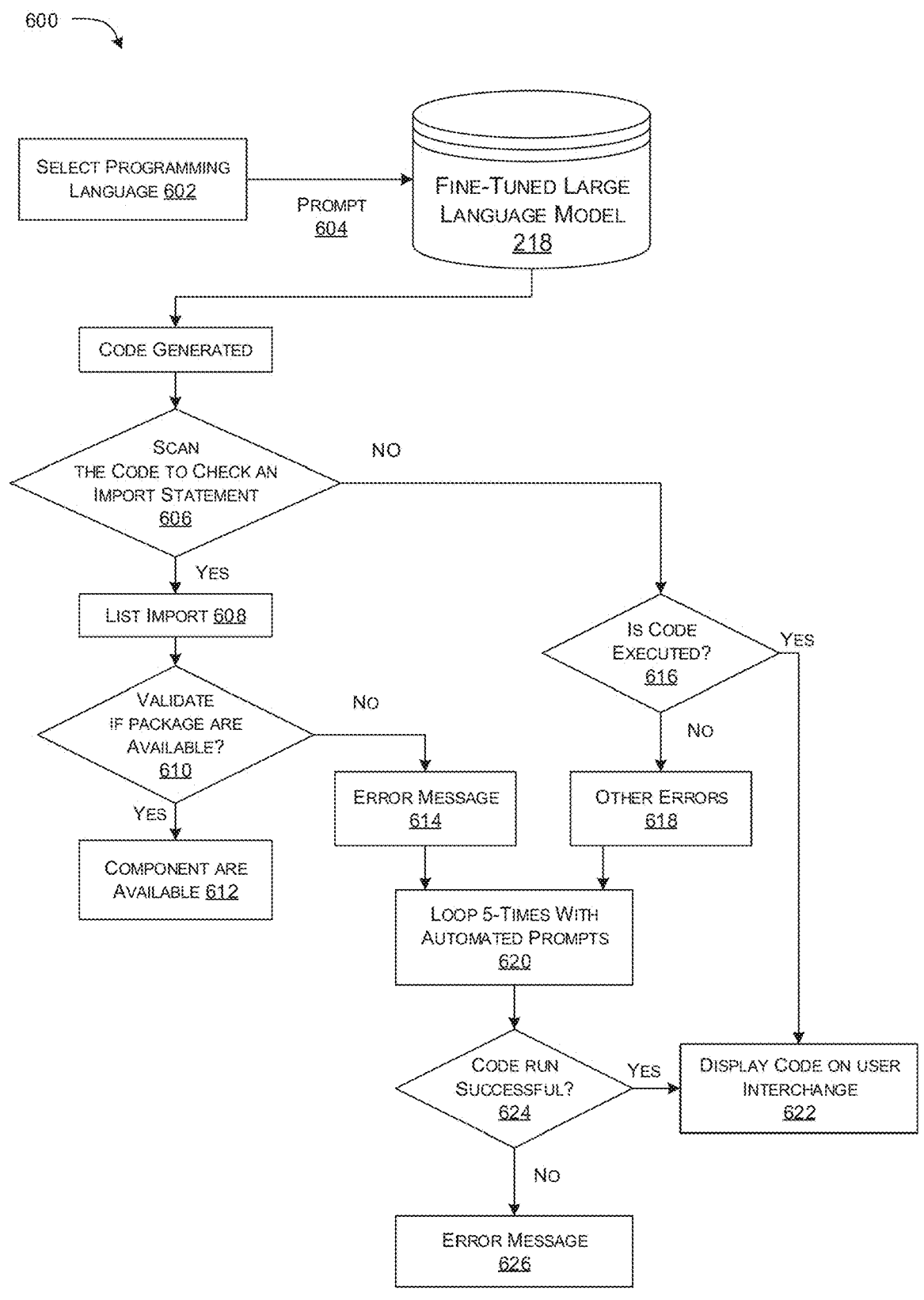
FIG. 6A is a flowchart illustrating a method for generating an architecture diagram code, in accordance with embodiments of the present disclosure.

FIG. 6A is a flowchart illustrating a method 600 for the architecture diagram code generation, in accordance with embodiments of the present disclosure. The method 600 starts at 602.

At 602, the user 108 selects the programming language in the user interface upon the architecture summary is generated. The system 102 may include a controller engine that triggers the code generation module 412 and checks if the programming language selected by the user 108 is Python, Mermaid, or PlantUML with an if else condition.

At 604, based on the language selected, the prompt is dynamically generated and sent to the fine-tuned LLM model 218 with hyperparameters set as per need. Based on the prompt, the architecture diagram code is generated in Python programming language with a short summary as the input. Once the architecture diagram code is generated, certain checks (error handling mechanism) are performed proactively before displaying the architecture diagram code to the end user 108 which will be explained further in detail.

At 606, the architecture diagram code is scanned to check if the code contains an import statement by validating Once the above check is successful, it indicates that the required components are available (see, 612). Else, the import error message is extracted (see, 614), Further, an automated prompt is triggered to the fine-tuned LLM model 218 for fixing the import error. This loop is executed for 5 iterations to check whether the import error and the other errors are resolved or not (see, 620). If the import error is resolved, then the architecture diagram code is executed to check if any other errors are present (see, 624). If the architecture diagram code is executed successfully in steps 624 and 616, then the architecture diagram code is displayed on the user interface (see, 622). If the architecture diagram code is not executed in step 624, the architecture diagram code is displayed with the error message and the user 108 must fix the code manually (see, 626).

Figure 6B:
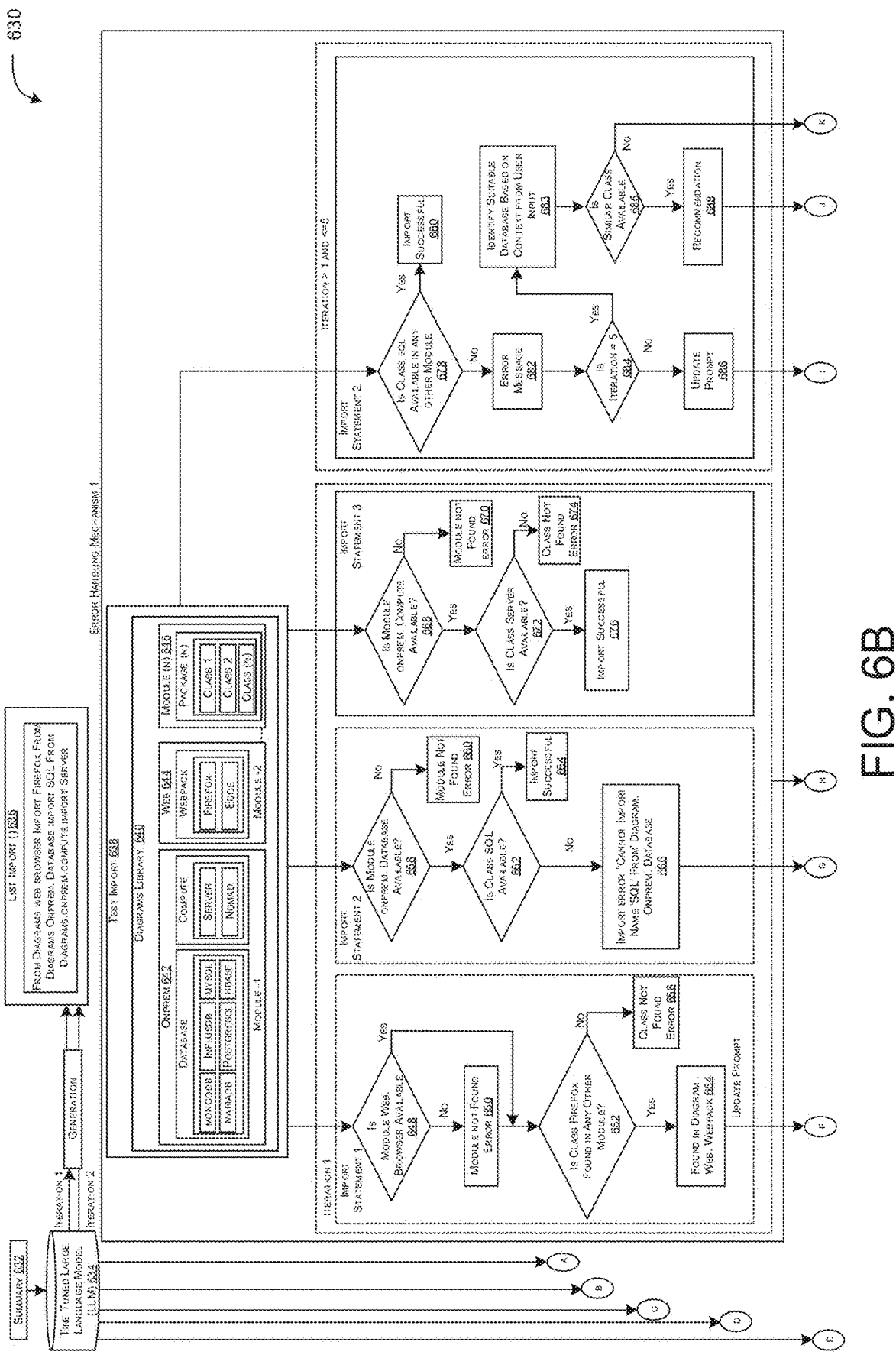
FIGS. 6B and 6C, collectively illustrate a process flowchart depicting an example method of error handling, in accordance with the embodiments of the present disclosure.
Figure 6C:
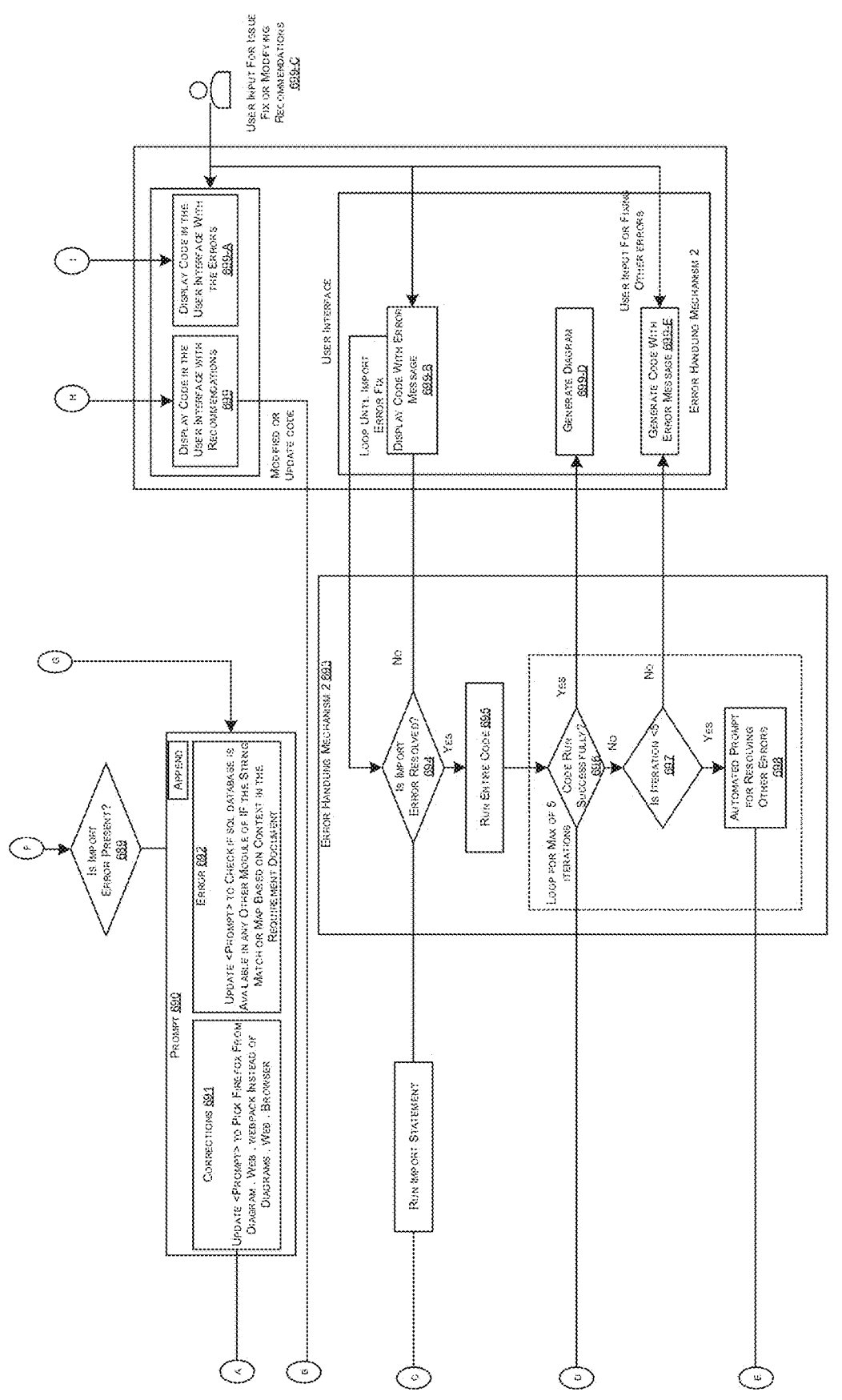

FIGS. 6B and 6C, collectively illustrate a process flow-chart depicting an example method of error handling, in accordance with the embodiments of the present disclosure. As explained above, before the generated diagram code is displayed to the end user 108, the architecture diagram code is executed in the backend to check if it is working as expected. As part of the execution, different checks are performed to validate if any error is present.

As part of the error handling mechanism, the import statements are listed from the architecture generated code. For example, the following statements are extracted from the architecture diagram code.

Import Statement 1: from diagrams.web.browser import Firefox

Import Statement 2: from diagrams.onprem.database import SQL

Import Statement 3: from diagrams.onprem.compute import Server

Note: The structure of import statements from <library-.module.submodule> import <class>

Once the import statements are listed, these import statements are executed in the backend to check if the required components are successfully imported from the suggested library. In this example we have the following modules, submodules, and classes that are listed in below table (Table 2).

TABLE 2

| Module | Submodule | Class1 | Class2 | Class3 | Class4 | Class5 | Class6 | Class(n) |
|--------|-----------|--------|--------|--------|--------|--------|--------|----------|
| onprem | database | mongodb | influxdb | mysql | mariadb | postgresql | hbase | (n) |
| | compute | server | nomad | — | — | — | — | (n) |
| webpack | browser | firefox | edge | — | — | — | — | (n) |
| Module (n) | (n) | (n) | (n) | (n) | (n) | (n) | (n) | (n) | against the import statement pattern. If the import statement are successfully validated against the import statement pattern, the import statements from the architecture diagram code are extracted and listed for further checks (see, 608). If the import statements are not matched, then step 616 is performed to check if the code is executed. If the code is not executed, other errors are listed (see, step 618). If the code is executed, step 622 is performed to display the architecture diagram code to the end user 108.

For these extracted statements, a check is performed in the backend to validate if these packages (components-classes, or modules) are available in the respective language libraries (see, 610). This logic is incorporated as the fine-tuned LLM model 218 may generate wrong or incorrect import statements.

The controller engine checks if the required module and submodule are available. If the required module and sub-module are available, then it checks if the required class is available. If the class is available, then the import is successful as in import statement 3. In this use case-import statement 3, the module and submodule onprem.compute is available, and the class server is available. The packages mentioned in the import statement of the generated diagram code is executable.

If the module or submodule; either of it is not available, then the controller engine checks if the required class is available in any other module or submodule. For example, in import statement 1, where module 'web' is not available, the controller engine throws an error saying, 'Module not found' and the controller engine checks if the required class 'firefox' is available in any other module. Since 'firefox' was available with the module 'webpack', this information is used for dynamically creating the automated prompt to correct the code with the appropriate details. This automated prompt is temporarily stored in the respective section (corrections or error) until all the import statements are validated. Once all the statements are validated, then automated prompts are appended and sent to the fine-tuned LLM for the second iteration of diagram code generation and validation.

As another scenario, if the module, submodule, and class is not available as in import statement 2, then the information from the error message is used for dynamically creating the automated prompts which will be sent to the fine-tuned LLM. Then in the subsequent iteration, the controller engine checks if there are any similar classes available based on the context from the user input. If a similar class is available, then the diagram code is updated or else it iterates 5 times (customizable) and then displays the error message in the chat window along with the last generated diagram code in the code section.

As explained above, the user provides the input to rectify the errors and the updates are sent to the fine-tuned LLM model 218. The import statements are re-validated to check if all the import errors are resolved. If the import statements are resolved, then the entire architecture diagram code is run to check if any other errors are present. If errors are present, similar checks are performed until resolution for a maximum of 5 iterations (customizable) where the error message is used for creating automated prompts for resolution. If the errors are resolved, then the architecture diagram code is displayed in the user interface. If import error persists, then the error message is displayed in the user interface for user's inputs to resolve the import error.

Further, after the creation of the high-level system architecture diagram representation and the application architecture diagram representation, for every component in the architecture, the relevant application code and its dependent code is recommended to the user 108. The static code analysis of historic code is performed using GenAI and the static code analysis tools to examine the code. The code is represented in continuous vector format as embeddings. These embeddings are represented as the knowledge graphs to understand the relationship between the code structures in a structured manner. The code search module leverages the relationship between the code and recommends to the end user 108 the application code along with the related code structures enabling the developers to jumpstart their development instead of developing from scratch. This brings about a reusability culture within their enterprise accelerating development. For further development, generative AI is used for code completion and real-time code generation.

FIG. 7 illustrates a flow chart depicting a method 700 for generating system architecture diagram representation, in accordance with the embodiments of the present disclosure.

At block 702, the method 700 may include receiving, by a processor 114, a request for generating at least one system architecture representation from at least one user 108. The request comprises a product requirement document, a type of system architecture, relevant architecture data, and a set of user inputs.

At block 704, the method 700 may include generating, by the processor 114, an architecture summary for the received request by analyzing the product requirement document, the type of system architecture, the relevant architecture data, and the set of user inputs using large language models 218.

At block 706, the method 700 may include determining, by the processor 114, an architecture pattern relevant to the received request based on a context of the generated architecture summary. The architecture pattern is determined by using at least one of the large language models and machine learning (ML) models 218.

At block 708, the method 700 may include generating, by the processor 114, an architecture code corresponding to the received request based on the generated architecture summary, a user selected language, the type of system architecture, and the determined architecture pattern.

At block 710, the method 700 may include validating, by the processor 114, the generated architecture code for determining at least one error in the generated architecture code by implementing the machine learning (ML) models. The generated architecture code is validated by the machine learning (ML) models based on at least one of compliance-based rules, legal-based rules, and security-based rules specific to an organization.

At block 712, the method 700 may include generating, by the processor 114, the at least one system architecture representation based on successful validation of the architecture code. The at least one system architecture representation includes a plurality of functional nodes hierarchically connected to indicate data flow for software deployment.

At block 714, the method 700 may include simulating, by the processor 114, the at least one system architecture representation for determining a success score of the at least one system architecture representation by implementing at least one of a static code analysis model and machine learning (ML) models.

At block 716, the method 700 may include outputting, by the processor 114, the generated architecture code and the at least one system architecture representation on a user interface.

At block 718, the method 700 may include simultaneously training, by the processor 114, the large language models and the ML models 218 with the generated architecture code, the at least one system architecture representation, and user feedback.

The method 700 may be implemented in any suitable hardware, software, firmware, or combination thereof. The order in which the method 700 is described is not intended to be construed as a limitation, and any number of the described method blocks may be combined or otherwise performed in any order to implement the method 700 or an alternate method. Additionally, individual blocks may be deleted from the method 700 without departing from the spirit and scope of the present disclosure described herein. Furthermore, the method 700 may be implemented in any suitable hardware, software, firmware, or a combination thereof, that exists in the related art or that is later developed. The method 700 describes, without limitation, the implementation of the system 102. A person of skill in the art will understand that method 700 may be modified appropriately for implementation in various manners without departing from the scope and spirit of the disclosure.

Figure 8A:
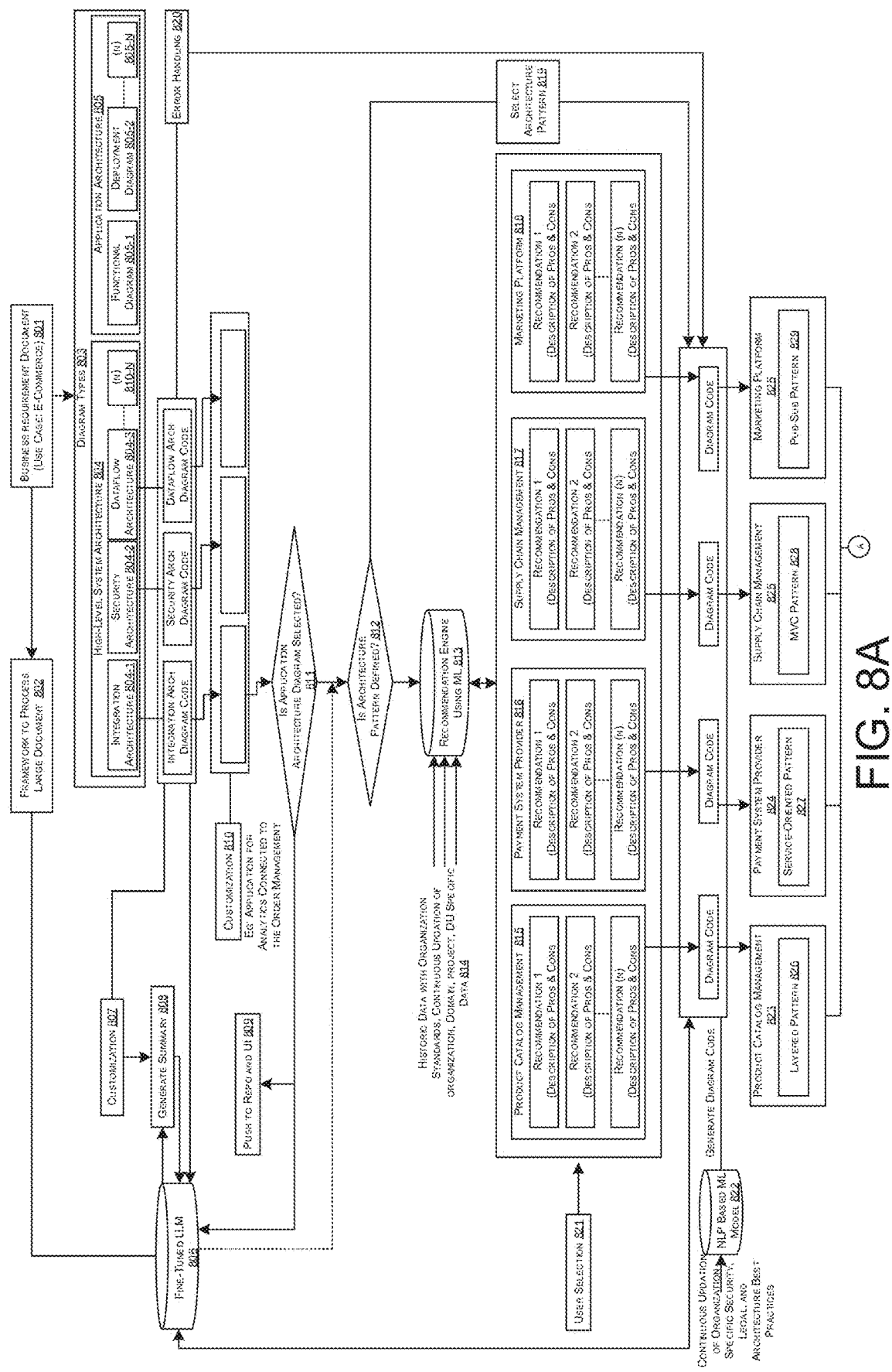
FIGS. 8A and 8B, collectively illustrate a process flowchart depicting an exemplary process of generating a system architecture diagram in an e-commerce use case environment, in accordance with the embodiments of the present disclosure.
Figure 8B:
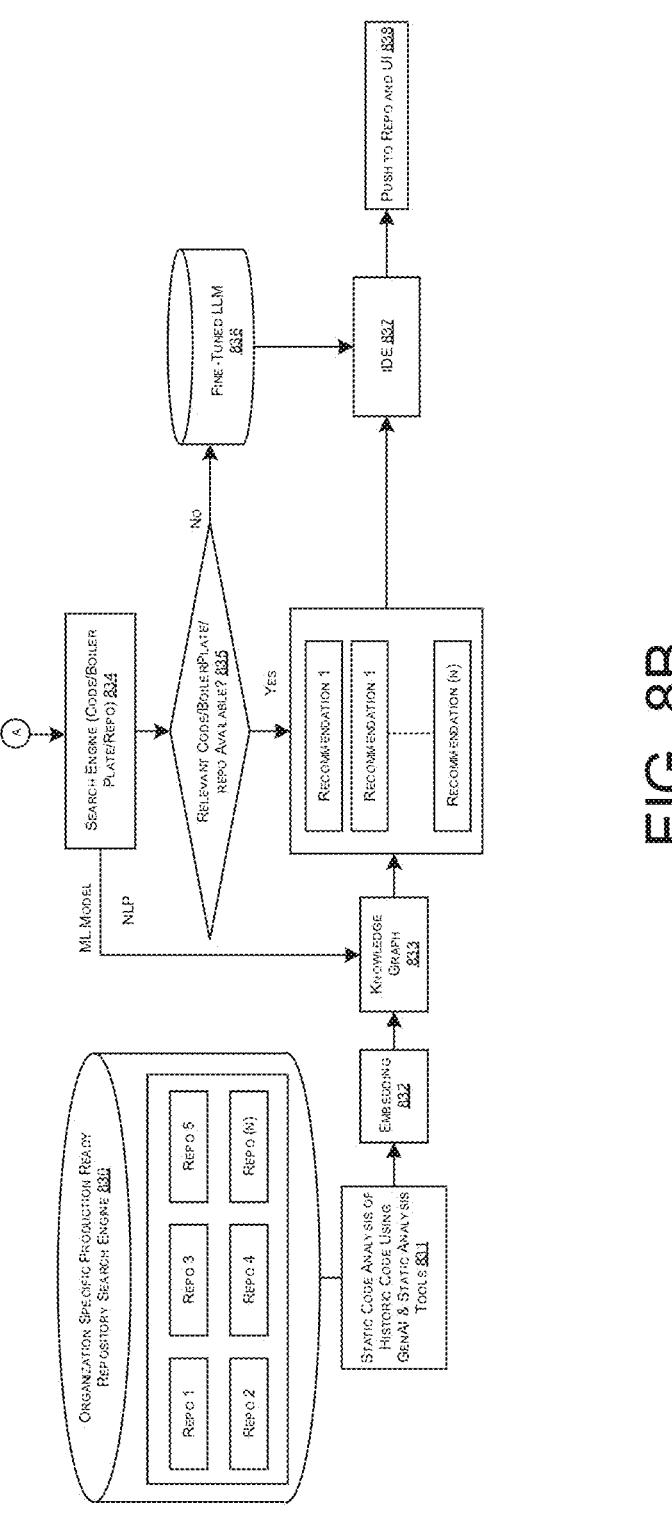

FIGS. 8A and 8B, collectively illustrate a process flowchart depicting an exemplary process of generating a system architecture diagram in an e-commerce use case environment, in accordance with the embodiments of the present disclosure. Initially, the user uploads the business requirement document (in pdf format) and selects the required high-level architecture and application architecture. In this use case, the selected architecture type may be an integration architecture and a functional diagram. Further, the business requirement document (consisting of hundreds of pages) may be broken down into chunks using a framework and fed to the fine-tuned model. Based on the architecture diagrams selected, for each diagram a summary is generated based on the diagram type. This summary may be customized, and the summary is fed back to the fine-tuned LLM. The fine-tuned LLM generates diagram code for each diagram type and creates the diagram. This diagram and diagram code may be edited by the user. For example, the user may wish to add an analytics component to the order management application to understand the buying patterns of customers and get the details of orders placed for a specific time frame, this input may be fed by the user through the customization feature which updates the diagram code and diagram with natural language input. Once the integration architecture is created, the logic checks if the user has selected any application-level architecture. To create the application-level architecture, deployment diagram (as selected in this use case), the architecture pattern is recommended by the ML model (trained with historic data of architecture patterns based on domain, organization, domain user (DU), and project requirements) if the user has not already provided the architecture pattern. For example, if most of the projects within the DU use GraphQL API layer as a middleware for managing data retrieval, then based on the user requested, the model may identify the architecture pattern predominantly used based on the domain, purpose, and the DU.

From the generated diagram summary, the diagram code and diagram are created based on the architecture pattern. An ML model (trained with organization specific security, legal, and compliance requirements) checks if the summary abides by the security, compliance, and legal requirements. For example, let us consider that the organization has a security mandate that data should be encrypted before storing in the database. However, this requirement was missed in the BRD and identified by the ML model and added thereby making it complied with all the requirements at the design phase itself.

Once the architecture diagram is generated, a code search (of application code) is performed for each component in the architecture. For example, if the UI is designed with react, the code search checks for the react modules and the relevant components along with its dependencies. A static code analysis is performed using GenAI and static code analysis tools on the historic data which generates knowledge graphs that helps in identifying the relevant code along with the other dependent code. These recommendations are ranked and listed to the user based on the contextual relevance.

The selected code are visible in the IDE which is connected with gen AI tools for real-time code recommendations. The diagram code, application code and user selections are sent for retaining continuously. This use case explains how our solution covers the architecture diagram creation and sets the foundation of application code components to jumpstart development without the need to build from scratch with faster feedback loops and retraining.

Figure 9:
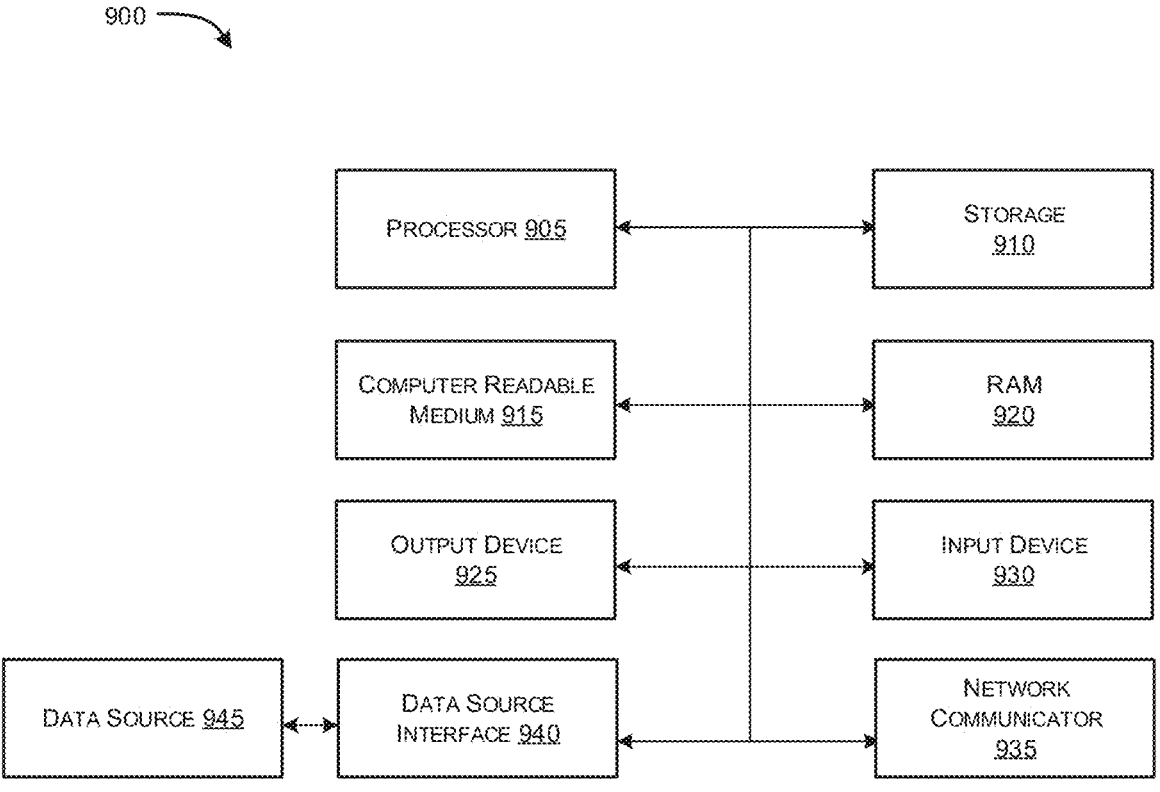
FIG. 9 is an exemplary block diagram representation of a hardware platform for implementation of the disclosed system, in accordance with embodiments of the present disclosure.

FIG. 9 illustrates an exemplary block diagram representation of a hardware platform 900 for implementation of the disclosed system 102, in accordance with embodiments of the present disclosure. For the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the hardware platform 900. As illustrated, the hardware platform 900 may include additional components not shown, and some of the components described may be removed and/or modified. For example, a computer system with multiple GPUs may be located on external-cloud platforms including Amazon Web Services® (AWS), internal corporate cloud computing clusters, or organizational computing resources.

The hardware platform 900 may be a computer system such as the system 102 that may be used with the embodiments described herein. The computer system may represent a computational platform that includes components that may be in a server or another computer system. The computer system may be executed by the processor 900 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., random access memory (RAM), read-only memory (ROM), erasable, programmable ROM (EPROM), electrically erasable, programmable ROM (EEPROM), hard drives, and flash memory). The computer system may include the processor 905 that executes software instructions or code stored on a non-transitory computer-readable storage medium 915 to perform methods of the present disclosure. The software code includes, for example, instructions to gather data and analyze the data.

The instructions on the computer-readable storage medium 1215 are read and stored the instructions in storage 910 or random-access memory (RAM) 920. The computer-readable storage medium 915 may provide a space for keeping static data where at least some instructions could be stored for later execution. The stored instructions may be further compiled to generate other representations of the instructions and dynamically stored in the RAM such as RAM 920. The processor 905 may read instructions from the RAM 920 and perform actions as instructed.

The computer system 102 may further include the output device 925 to provide at least some of the results of the execution as output including, but not limited to, visual information to users, such as external agents. The output device 925 may include a display on computing devices and virtual reality glasses. For example, the display may be a mobile phone screen or a laptop screen. GUIs and/or text may be presented as an output on the display screen. The computer system 102 may further include an input device 930 to provide a user or another device with mechanisms for entering data and/or otherwise interacting with the computer system 102. The input device 930 may include, for example, a keyboard, a keypad, a mouse, or a touchscreen. Each of these output devices 925 and input device 930 may be joined by one or more additional peripherals. For example, the output device 925 may be used to display the results such as bot responses by the executable chatbot.

A network communicator 935 may be provided to connect the computer system 102 to a network and in turn to other devices connected to the network including other clients, servers, data stores, and interfaces, for example. A network communicator 935 may include, for example, a network adapter such as a LAN adapter or a wireless adapter. The computer system 102 may include a data sources interface 940 to access the data source interface 945. The data source interface 945 may be an information resource. As an example, a database of exceptions and rules may be provided as the data source interface 945. Moreover, knowledge repositories and curated data may be other examples of the data source interface 945.

The present disclosure provides a system and a method for generating system architecture representation by implementing machine learning (ML) techniques. The present system dynamically generates different types of architecture diagrams concurrently without any user intervention where the user can create a diagram from scratch or reuse the existing architecture diagram (intelligently identified by the model based on the context provided by the user).

Further, the present systems and methods are capable of analyzing the gaps (or the missing information) in the user input for generating a specific architecture diagram and intelligently raising questions (or prompts) to get the required input from the user or a chatbot. The present system allows the customization of the model to improve the model performance specific to the context of the business use case using hyperparameters. The model is customized by training with huge sets of private data specific to the organization containing enterprise data like architecture diagrams, security requirements and mandates to be adhered at org level, high-level design documents, low-level design documents, and so on across domains and industries thereby making the architecture generation context-aware with organizational relevance. The model intelligently identifies if the input deviates from the security guidelines of the organization and notifies the user. This way the gaps are eliminated at the design phase of SDLC, and the architecture is designed within the security landscape of the organization.

The present system generates automated prompts based on the context and includes error handling mechanism. These features of the present system may increase the accuracy of the generated architecture diagram code and the system architecture diagram representation in a fully auto-mated zero-touch method. These unique logics are written from scratch in an intelligent manner that it can analyze the generated code (test and evaluate if the generated code is valid by executing it in the backend. Else automatically fixing the errors and identifying the suitable component based on the context). Further, auto-heal and auto-fix the errors by creating automated prompts and create the various architecture diagrams without any user intervention. These automated prompts are a mix of pre-defined and dynami-cally generated prompts that are created based on the results of the validation (error fix).

Further, the architecture diagram code and the system architecture diagram representation may be easily modified with the natural language which gets converted to prompt for getting the desired output. The disclosed system may also have a compiler that may execute the code internally ensuring data privacy.

Additionally, another feature may the intelligence in the present system to understand the context of the user input and identify the best available resources for the system architecture diagram representation and the architecture code generation by reusing the existing architecture dia-grams.

The written description describes the subject matter herein to enable any person skilled in the art to make and use the embodiments. The scope of the subject matter embodi-ments is defined by the claims and may include other modifications that occur to those skilled in the art. Such other modifications are intended to be within the scope of the claims if they have similar elements that do not differ from the literal language of the claims or if they include equiva-lent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the disclosure. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated steps are set out to explain the exemplary embodiments shown, and it should be anticipated that ongo-ing technological development will change the manner in which particular functions are performed. These examples are presented herein for purposes of illustration, and not limitation. Further, the boundaries of the functional building blocks have been arbitrarily defined herein for the conve-nience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional pur-poses, and it may not have been selected to delineate or circumscribe the inventive subject matter. It is therefore intended that the scope of the disclosure be limited not by this detailed description, but rather by any claims that issue on an application based here on. Accordingly, the embodi-ments of the present disclosure are intended to be illustra-tive, but not limited, of the scope of the disclosure, which is outlined in the following claims.

What is claimed is:

1. A system, comprising:
   a processor; and
   a memory communicably coupled to the processor, wherein the memory comprises processor-executable instructions which, when executed by the processor, cause the processor to:
      receive a request for generating at least one system architecture representation from at least one user, wherein the request comprises a product requirement document, a type of system architecture, relevant architecture data, and a set of user inputs;

generate an architecture summary for the received request by analyzing the product requirement document, the type of system architecture, the relevant architecture data, and the set of user inputs using large language models;

determine an architecture pattern relevant to the received request based on a context of the generated architecture summary, wherein the architecture pattern is determined by using at least one of the large language models and machine learning (ML) models;

generate an architecture code corresponding to the received request based on the generated architecture summary, a user selected language, the type of system architecture, and the determined architecture pattern;

validate the generated architecture code for determining at least one error in the generated architecture code by implementing the machine learning (ML) models, wherein the generated architecture code is validated by the machine learning (ML) models based on at least one of compliance-based rules, legal-based rules, and security-based rules specific to an organization;

generate the at least one system architecture representation based on successful validation of the architecture code, wherein the at least one system architecture representation comprises a plurality of functional nodes hierarchically connected to indicate data flow for software deployment;

simulate the at least one system architecture representation for determining a success score of the at least one system architecture representation by implementing at least one of a static code analysis model and machine learning (ML) models;

output the generated architecture code and the at least one system architecture representation on a user interface; and simultaneously retrain the large language models, and the ML models with the generated architecture code, the at least one system architecture representation, and user feedback.

2. The system of claim 1, wherein the processor is configured to:

continuously train the machine learning (ML) models with historical organization specific data corresponding to a plurality of architecture types, architecture patterns with domains, and domain unit (DU) specific details, and wherein the historical organization specific data comprises enterprise data related to architecture diagrams, security compliance parameters and mandates to be complied at an organization level, high-level design documents, and low-level design documents.

3. The system of claim 1, wherein the processor is configured to:

generate the architecture code for at least one of a high-level system architecture and an application-level system architecture based on the request received from the at least one user, wherein the application-level system architecture representation is generated upon generating the high-level system architecture representation and determining the architecture pattern; and generate the application-level system architecture representation in response to generating the architecture code for at least one of the high-level system architecture and the application-level system architecture.

4. The system of claim 1, wherein in generating the architecture code corresponding to the received request based on the generated architecture summary, the user selected language, the type of system architecture, and the determined architecture pattern, the processor is configured to:

generate a knowledge graph representation for the generated system architecture representation based on the static code analysis model, wherein the knowledge graph representation comprises application code and respective connected components, and wherein the static code analysis model comprises a static code represented in a continuous vector format as embeddings, and wherein the embeddings are represented as knowledge graphs indicating a relationship between code structures in a structured manner; and recommend the application code with the related code structures based on the generated knowledge graph for developing a software code.

5. The system of claim 1, wherein in validating the generated architecture code for determining the at least one error in the generated architecture code by implementing the machine learning (ML) models, the processor is configured to:

identify a plurality of errors in at least the set of user inputs, and the architecture code by validating the architecture code using the machine learning (ML) models;

map the plurality of errors with a pre-stored error table to determine error rectification instructions and solutions;

generate a plurality of error rectification messages based on the mapping, wherein the error rectification messages comprise the error rectification instructions and solutions; and output the generated plurality of error rectification messages and dynamically generate prompts corresponding to the plurality of errors identified for rectifying the plurality of errors in the architecture code.

6. The system of claim 5, wherein the plurality of errors are dynamically rectified in the architecture code based at least on the implementation of the machine learning (ML) models in response to at least the generated prompts, the generated prompts comprising the error rectification instructions and solutions corresponding to the identified plurality of errors.

7. The system of claim 1, wherein in validating the generated architecture code for determining the at least one error in the generated architecture code by implementing the machine learning (ML) models, the processor is configured to:

determine an import statement and an import statement pattern associated with the architecture code;

identify the plurality of errors in the architecture code by determining a mismatch in components associated with the import statement and the import statement pattern; and generate prompts to rectify the identified plurality of errors, wherein the prompts indicate results of validation.

8. The system of claim 1, wherein the processor is configured to:

receive the set of user inputs from the at least one user via a generative artificial intelligence (AI)-based chat-bot, wherein the received set of user inputs are pre-processed to generate a vector form of the set of user inputs, and wherein the vector form of the set of user inputs is generated based at least on a set of hyperparameters defined for the at least one system architecture representation to be generated;

periodically validate the received set of user inputs using the ML models to determine the plurality of errors;

generate a plurality of recommendations to modify the architecture code and the architecture representation based on the validation; and train the ML models with one of the received set of user inputs and the generated plurality of recommendations based on successful validation.

9. The system of claim 1, wherein in generating the at least one system architecture representation based on successful validation of the architecture code, the processor is configured to:

determining a plurality of components and sub-components required for generating the at least one system architecture presentation based on the validated architecture code;

determining level of hierarchy for each of the determined plurality of components and the subcomponents based on the validated architecture code;

determining a data flow and relationship between the plurality of components and sub-components based on the level of hierarchy and the validated architecture code;

connecting input and output channels of each of the plurality of components and sub-components based on the determined data flow and based on one of compliance-based rules, legal-based rules, and security-based rules specific to an organization; and generating the at least one system architecture representation based on the connection, the determined data flow, the determined level of hierarchy and the plurality of components and sub-components.

10. The system of claim 1, wherein in validating the generated architecture code for determining the at least one error in the generated architecture code by implementing the machine learning (ML) models, the processor is configured to:

identify missing information in the set of user inputs received from the at least one user by analyzing content, context, and a pre-requisite criteria of the set of user inputs;

dynamically create a prompt for the identified missing information from the set of user inputs and the architecture summary;

obtain the missing information from the at least one user via a generative AI-based chatbot; and update the architecture summary based on obtained missing information.

11. The system of claim 1, wherein the processor is configured to:

receive a set of customization inputs in the form of natural language input for updating the architecture code in real-time;

validate whether the received set of customization inputs meet pre-defined criteria using the machine learning (ML) models; and update the architecture code based on the received set of customization inputs upon successful validation.

12. The system of claim 1, wherein in simulating the at least one system architecture representation for determining the success score of the at least one system architecture representation, the processor is configured to:

determine a simulation level of the at least one system architecture representation by implementing at least one of a static code analysis model and the machine learning (ML) models; and compute the success score of the at least one system architecture representation corresponding to the determined simulation level.

13. A method, comprising:

receiving, by a processor, a request for generating at least one system architecture representation from at least one user, wherein the request comprises a product requirement document, a type of system architecture, relevant architecture data, and a set of user inputs;

generating, by the processor, an architecture summary for the received request by analyzing the product requirement document, the type of system architecture, the relevant architecture data, and the set of user inputs using large language models;

determining, by the processor, an architecture pattern relevant to the received request based on a context of the generated architecture summary, wherein the architecture pattern is determined by using at least one of the large language models and machine learning (ML) models;

generating, by the processor, an architecture code corresponding to the received request based on the generated architecture summary, a user selected language, the type of system architecture, and the determined architecture pattern;

validating, by the processor, the generated architecture code for determining at least one error in the generated architecture code by implementing the machine learning (ML) models, wherein the generated architecture code is validated by the machine learning (ML) models based on at least one of compliance-based rules, legal-based rules, and security-based rules specific to an organization;

generating, by the processor, the at least one system architecture representation based on successful validation of the architecture code, wherein the at least one system architecture representation comprises a plurality of functional nodes hierarchically connected to indicate data flow for software deployment;

simulating, by the processor, the at least one system architecture representation for determining a success score of the at least one system architecture representation by implementing at least one of a static code analysis model and machine learning (ML) models;

outputting, by the processor, the generated architecture code and the at least one system architecture representation on a user interface; and simultaneously retraining, by the processor, the large language models, and the ML models with the generated architecture code, the at least one system architecture representation, and user feedback.

14. The method of claim 13, further comprising:

continuously training, by the processor, the machine learning (ML) models with historical organization specific data corresponding to a plurality of architecture types, architecture patterns with domains, and domain unit (DU) specific details, and wherein the historical organization specific data comprises enterprise data related to architecture diagrams, security-compliance parameters and mandates to be complied at an organization level, high-level design document, and low-level design documents.

15. The method of claim 13, wherein generating the architecture code corresponding to the received request based on the generated architecture summary, the user selected language, the type of system architecture, and the determined architecture pattern comprises:

generating, by the processor, a knowledge graph representation for the generated system architecture representation based on the static code analysis model, wherein the knowledge graph representation comprises application code and respective connected components, and wherein the static code analysis model comprises a static code represented in a continuous vector format as embeddings, and wherein the embeddings are represented as knowledge graphs indicating a relationship between code structures in a structured manner; and recommend the application code with the related code structures based on the generated knowledge graph for developing a software code.

16. The method of claim 13, wherein validating the generated architecture code for determining the at least one error in the generated architecture code by implementing the machine learning (ML) models comprises:

identifying, by the processor, a plurality of errors in at least the set of user inputs, and the architecture code by validating the architecture code using the machine learning (ML) models;

mapping, by the processor, the plurality of errors with a pre-stored error table to determine error rectification instructions and solutions;

generating, by the processor, a plurality of error rectification messages based on the mapping, wherein the error rectification messages comprise the error rectification instructions and solutions; and outputting, by the processor, the generated plurality of error rectification messages and dynamically generate prompts corresponding to the plurality of errors identified for rectifying the plurality of errors in the architecture code, wherein the plurality of errors are dynamically rectified in the architecture code based at least on the implementation of the machine learning (ML) models in response to at least the generated prompts, the generated prompts comprising the error rectification instructions and solutions corresponding to the identified plurality of errors.

17. The method of claim 13, wherein validating the generated architecture code for determining the at least one error in the generated architecture code by implementing the machine learning (ML) models comprises:

determining, by the processor, an import statement and an import statement pattern associated with the architecture code;

identifying, by the processor, the plurality of errors in the architecture code by determining a mismatch in components associated with the import statement and the import statement pattern; and generating, by the processor, prompts to rectify the identified plurality of errors, wherein the prompts indicate results of validation.

18. The method of claim 13, further comprising:

receiving, by the processor, the set of user inputs from the at least one user via a generative artificial intelligence (AI)-based chat-bot;

periodically validating, by the processor, the received set of user inputs using the ML models to determine the plurality of errors;

generating, by the processor, a plurality of recommendations to modify the architecture code and the architecture representation based on the validation; and training, by the processor, the ML models with one of the received set of user inputs and the generated plurality of recommendations based on successful validation.

19. The method of claim 13, further comprising:

identifying, by the processor, missing information in the set of user inputs received from the at least one user by analyzing content, context, and a pre-requisite criteria of the set of user inputs;

dynamically creating, by the processor, a prompt for the identified missing information from the set of user inputs and the architecture summary;

obtaining, by the processor, the missing information from the at least one user via a generative AI-based chatbot; and updating, by the processor, the architecture summary based on obtained missing information.

20. A non-transitory computer readable medium comprising a processor-executable instructions that cause a processor to:

receive a request for generating at least one system architecture representation from at least one user, wherein the request comprises a product requirement document, a type of system architecture, relevant architecture data, and a set of user inputs;

generate an architecture summary for the received request by analyzing the product requirement document, the type of system architecture, the relevant architecture data, and the set of user inputs using large language models;

determine an architecture pattern relevant to the received request based on a context of the generated architecture summary, wherein the architecture pattern is determined by using at least one of the large language models and machine learning (ML) models;

generate an architecture code corresponding to the received request based on the generated architecture summary, a user selected language, the type of architecture, and the determined architecture pattern;

validate the generated architecture code for determining at least one error in the generated architecture code by implementing the machine learning (ML) models, wherein the generated architecture code is validated by the machine learning (ML) models based on at least one of compliance-based rules, legal-based rules, and security-based rules specific to an organization;

generate at least one system architecture representation based successful validation of the architecture code, wherein the at least one system architecture representation comprises a plurality of functional nodes hierarchically connected to indicate data flow for software deployment;

simulate the at least one system architecture representation for determining a success score of the system architecture representation by implementing at least one of a static code analysis model and the machine learning (ML) models;

output the generated architecture code and the at least one system architecture representation on a user interface; and simultaneously retrain the large language models and the ML models with the generated architecture code, the at least one system architecture representation, and a user feedback.

* * * * *